United States Patent
Kramer et al.

(10) Patent No.: US 11,010,711 B1
(45) Date of Patent: May 18, 2021

(54) TEST-ENABLED MEASUREMENTS FOR A SENSOR-BASED DEVICE

(71) Applicant: Amazon Technologies, Inc., Seattle, WA (US)

(72) Inventors: Allison Kramer, Seattle, WA (US); Samuel Stevens Heyworth, Seattle, WA (US); Roland Jones, San Jose, CA (US); Devon Merritt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 439 days.

(21) Appl. No.: 15/934,780

(22) Filed: Mar. 23, 2018

(51) Int. Cl.
*G06Q 10/08* (2012.01)
*G06Q 20/20* (2012.01)
*B65D 1/22* (2006.01)
*G01B 11/02* (2006.01)

(52) U.S. Cl.
CPC ............ *G06Q 10/087* (2013.01); *B65D 1/22* (2013.01); *G01B 11/026* (2013.01); *G06Q 10/08* (2013.01); *G06Q 20/203* (2013.01)

(58) Field of Classification Search
CPC ..... G06Q 10/087; G06Q 10/08; G06Q 20/203
USPC ............................................. 705/28, 22, 29
See application file for complete search history.

(56) References Cited

U.S. PATENT DOCUMENTS

| | | |
|---|---|---|
| 5,168,445 A | 12/1992 | Kawashima et al. |
| 5,235,509 A | 8/1993 | Mueller et al. |
| 6,204,763 B1 | 3/2001 | Sone |
| 6,799,085 B1 | 9/2004 | Crisp, III |
| 7,542,866 B1 | 6/2009 | Lovegren et al. |
| 8,005,761 B1 | 8/2011 | Braumoeller et al. |
| 8,260,672 B2 | 9/2012 | Weel et al. |
| 8,718,620 B2 | 5/2014 | Rosenblatt |
| 9,267,834 B2 | 2/2016 | Chowdhary et al. |
| 9,619,831 B1 | 4/2017 | Kumar et al. |
| 10,360,617 B2 | 7/2019 | High et al. |
| 10,438,276 B2 | 10/2019 | Godsey et al. |

(Continued)

FOREIGN PATENT DOCUMENTS

| | | |
|---|---|---|
| WO | 2016149674 | 9/2016 |
| WO | 2017118845 | 7/2017 |

OTHER PUBLICATIONS

U.S. Appl. No. 15/918,205, titled "Managing Shipments Based on Data From a Sensor-Based Automatic Replenishment Device," filed Mar. 12, 2018.

(Continued)

*Primary Examiner* — Florian M Zeender
*Assistant Examiner* — Christopher R Buchanan
(74) *Attorney, Agent, or Firm* — Kilpatrick Townsend & Stockton LLP

(57) ABSTRACT

Utilizing the techniques disclosed herein, sensor data inaccuracies may be corrected such that calculated fill levels more accurately reflect the actual fill level of the item within an automatic replenishment device (ARD). For example, the ARD may include a sensor configured to collect the sensor data (e.g., a distance between the sensor and an item contained within the ARD). Sensor data associated with an item within the ARD may be received. A measurement offset value specific to the item may be identified. An estimated fill level of the item within the ARD may be calculated based at least in part on the distance measured between the sensor and the item and the measurement offset value specific to the item.

20 Claims, 12 Drawing Sheets

(56) References Cited

U.S. PATENT DOCUMENTS

| | | | |
|---|---|---|---|
| 10,445,672 | B2 | 10/2019 | Renfroe |
| 10,445,819 | B2 | 10/2019 | Renfroe |
| 10,474,987 | B2 | 11/2019 | Corona et al. |
| 2006/0206373 | A1 | 9/2006 | Blair et al. |
| 2007/0162326 | A1 | 7/2007 | Weel et al. |
| 2008/0113614 | A1 | 5/2008 | Rosenblatt |
| 2010/0076903 | A1 | 3/2010 | Klingenberg et al. |
| 2011/0153466 | A1 | 6/2011 | Harish et al. |
| 2012/0038456 | A1 | 2/2012 | Pikkarainen et al. |
| 2013/0038455 | A1 | 2/2013 | Chowdhary et al. |
| 2013/0231877 | A1 | 9/2013 | Weber et al. |
| 2013/0300595 | A1 | 11/2013 | Hemmendorff |
| 2014/0095479 | A1 | 4/2014 | Chang et al. |
| 2014/0203040 | A1* | 7/2014 | Clark ............... B05C 11/1042 222/54 |
| 2015/0142621 | A1 | 5/2015 | Gray et al. |
| 2015/0178654 | A1 | 6/2015 | Glasgow et al. |
| 2015/0186836 | A1 | 7/2015 | Chouhan et al. |
| 2015/0278912 | A1 | 10/2015 | Melcher et al. |
| 2015/0302510 | A1 | 10/2015 | Godsey et al. |
| 2015/0329260 | A1 | 11/2015 | Singh |
| 2016/0019780 | A1 | 1/2016 | Gettings et al. |
| 2016/0040580 | A1* | 2/2016 | Khaled ............... F01N 11/00 60/277 |
| 2016/0132821 | A1 | 5/2016 | Glasgow et al. |
| 2016/0134930 | A1 | 5/2016 | Swafford |
| 2016/0203431 | A1 | 7/2016 | Renfroe |
| 2016/0229678 | A1 | 8/2016 | Difatta et al. |
| 2016/0314514 | A1 | 10/2016 | High et al. |
| 2016/0347540 | A1 | 12/2016 | Skocypec et al. |
| 2017/0201057 | A1* | 7/2017 | Ahlawat ............... H01S 3/104 |
| 2017/0300984 | A1 | 10/2017 | Hurwich |
| 2018/0053140 | A1 | 2/2018 | Baca et al. |
| 2018/0164143 | A1 | 6/2018 | Gurumohan et al. |
| 2018/0165627 | A1 | 6/2018 | Jones et al. |
| 2018/0260779 | A1* | 9/2018 | Singh ............... G06Q 30/0282 |
| 2018/0308514 | A1* | 10/2018 | Li ............... G11B 5/3932 |
| 2019/0108483 | A1 | 4/2019 | Tineo |
| 2019/0295148 | A1* | 9/2019 | Lefkow ............... G06Q 30/0633 |
| 2020/0105409 | A1* | 4/2020 | Kochar ............... G06Q 10/10 |

OTHER PUBLICATIONS

U.S. Appl. No. 15/926,779, titled "Product Specific Correction for a Sensor-Based Device," filed Mar. 20, 2018.

U.S. Appl. No. 15/927,324, titled "Managing Electronic Requests Associated With Items Stored by Automatic Replenishment Devices," filed Mar. 21, 2018.

U.S. Appl. No. 15/927,946, titled "Automatic Replenishment of Items Utilizing a Sensor-Based Device," filed Mar. 21, 2018.

U.S. Appl. No. 15/927,990, titled "Order Quantity and Product Recommendations Based on Sensor Data," filed Mar. 21, 2018.

U.S. Appl. No. 15/927,998, titled "Predictive Consolidation System Based on Sensor Data," filed Mar. 21, 2018.

U.S. Appl. No. 15/928,370, titled "Product and Lid Identification for Sensor-Based Device," filed Mar. 22, 2018.

U.S. Appl. No. 15/928,409, titled "LED Enhanced Product and Lid Identification for Sensor-Based Device," filed Mar. 22, 2018.

U.S. Appl. No. 15/963,761, titled "Sensor-Related Improvements to Automatic Replenishment Devices," filed Apr. 26, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

PCT/US2019/022215, "International Search Report and Written Opinion", dated Apr. 29, 2019, 11 pages.

"Amazon Dash Replacement for Developers", Youtube, Available Online at: https://www.youtube.com/watch?v=WS42WcuSyVU, Jan. 30, 2017, 4 pages.

Li et al., "Discussion of Principle and Application for Internet of Things", Applied Mechanics and Materials, vol. 347-350, 2013, pp. 3322-3325.

Welch et al., "Seven Keys to ERP Success", Strategic Finance, vol. 89, No. 3, Institute of Management Accountants, Sep. 2007, pp. 41-61.

"Amazon Dash Replenishment", XP054979477, Available online at: https://www.youtube.com/watch?v=vTYcWG6BIDY, Jan. 19, 2016, 3 pages.

"Amazon Dash Replenishment for Developers", XP054979476, Available online at: https://www.youtube.com/watch?v=WS42WcuSyVU, Jan. 30, 2017, 5 pages.

"Dash Replenishment Service CX Guidelines", Dash Replenishment Service, XP055598411, Available online at: https://web.archive.org/web/20171208012109/https://developer.amazon.com/docs/dash/customer-experience-guidelines.html, Dec. 8, 2017, 9 pages.

"Dash Replenishment Service Glossary", Dash Replenishment Service, XP055598456, Available online at: https://web.archive.org/web/20171208041422/https://developer.amazon.com/docs/dash/glossary.html, Dec. 8, 2017, 6 pages.

"Frequently Asked Questions", Dash Replenishment Service, XP055598417, Available online at: https://web.archive.org/web/20171208012934/https://developer.amazon.com/docs/dash/faqs.html, Dec. 8, 2017, 5 pages.

"GetOrderInfo Endpoint", Dash Replenishment Service, XP055598458, Available online at: https://web.archive.org/web/20171208041609/https://developer.amazon.com/docs/dash/getorderinfo-endpoint.html, Dec. 8, 2017, 6 pages.

"Notification Messages (DRS)", Dash Replenishment Service, XP055598457, Available online at: https://web.archive.org/web/20171208041525/https://developer.amazon.Gom/docs/dash/notification-messages.html, Dec. 8, 2017, 14 pages.

"SlotStatus Endpoint", Dash Replenishment Service, XP055598461, Available online at: https://web.archive.org/web/20171208041548/https://developer.amazon.com/docs/dash/slotstatus-endpoint.html, Dec. 8, 2017, 7 pages.

U.S. Appl. No. 15/696,040, titled "Sensor Data-Based Reordering of Items," filed Sep. 5, 2017.

\* cited by examiner

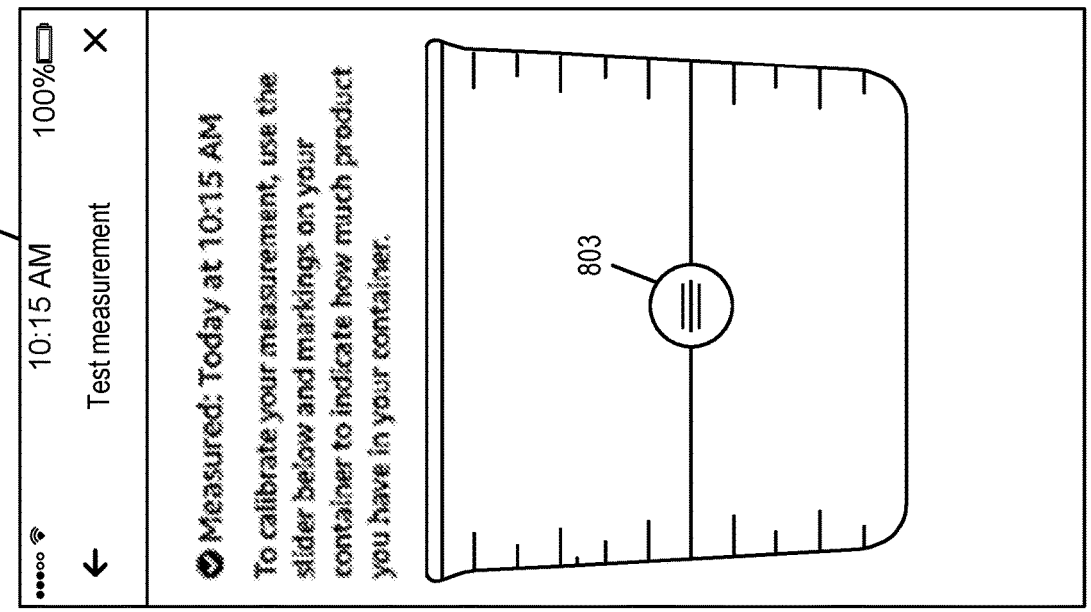
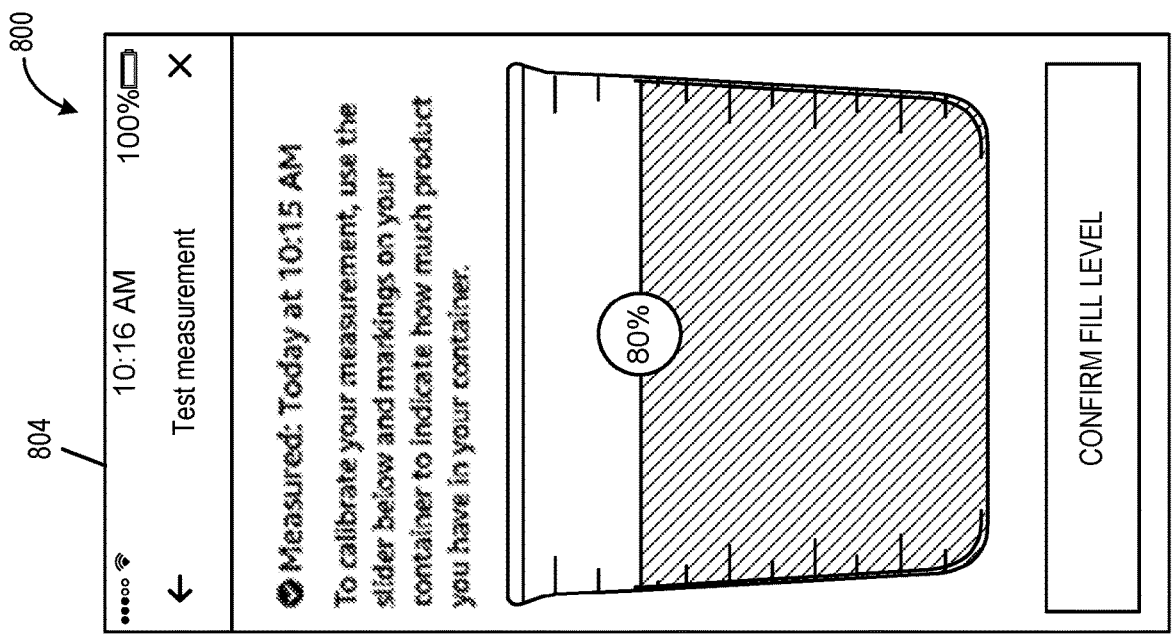
FIG. 8

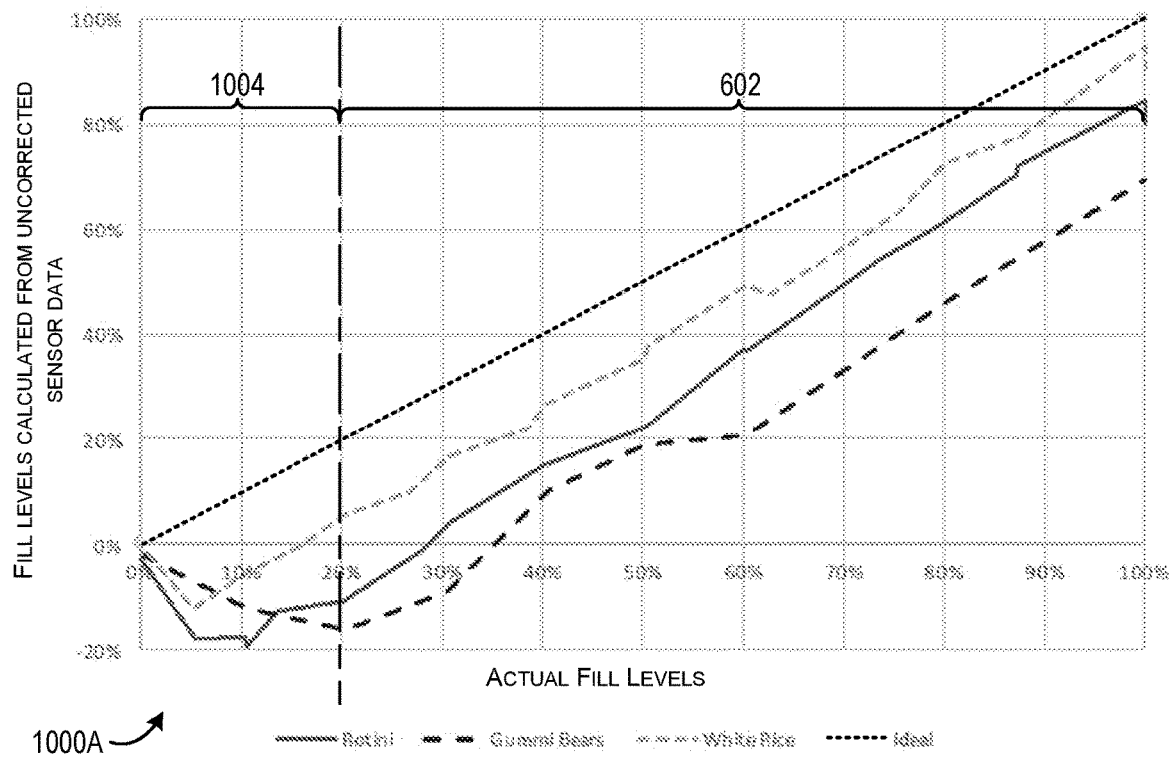
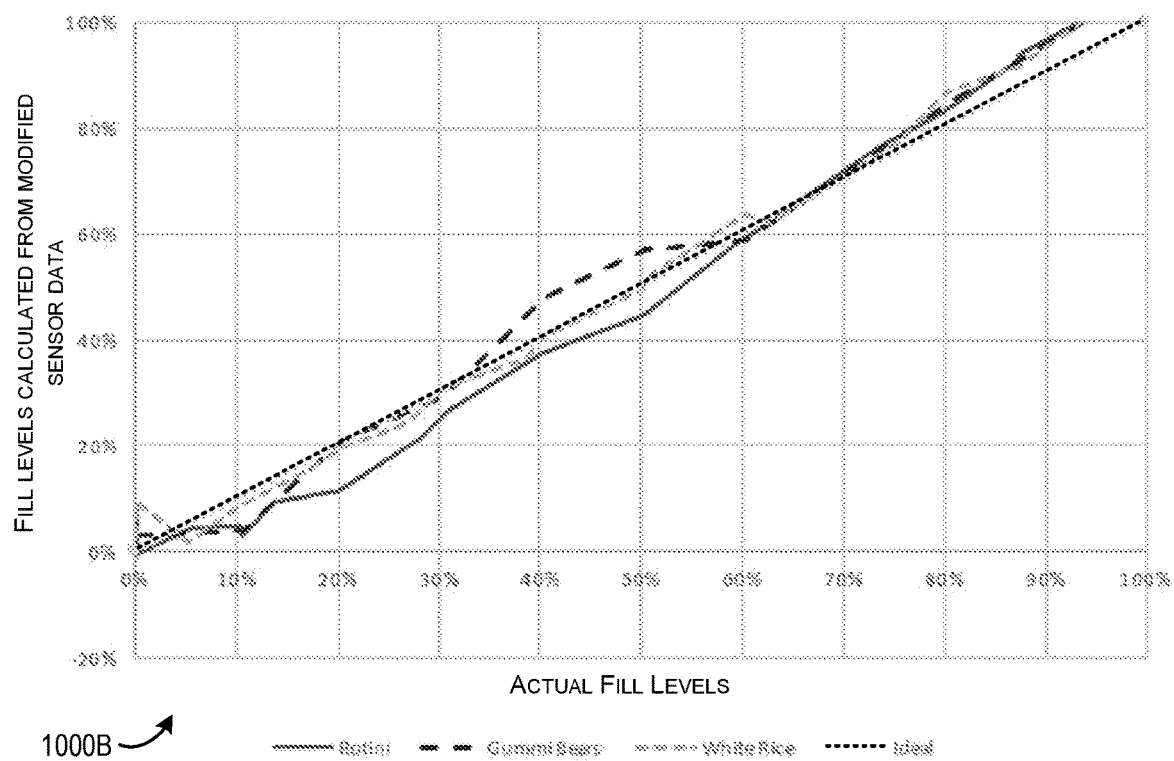
FIG. 10

TEST-ENABLED MEASUREMENTS FOR A SENSOR-BASED DEVICE

BACKGROUND

Online retailers as well as brick and mortar retailers offer subscription services that deliver items to customers on a periodic basis. However, services such as subscriptions can deliver items even when the customer has not fully consumed previously-delivered items resulting in a build-up of the item at the customer's home or workplace. Conventional static subscription and delivery services fail to account for varied consumption of the item by the customer. For example, current replenishment techniques may utilize a static frequency at which an item is to be provided regardless of the rate of consumption actually realized by the customer. Although the user may modify the static frequency, subscription service typically require the customer to take proactive action to modify a subscription and/or place a reorder for an item. Conventionally, as a customer depletes a supply of an item, or nearly depletes the supply, the customer may place a new order for more supply of the product by interacting with a website associated with an online marketplace and/or utilizing a mobile application associated with an entity that facilitates the order/purchase of the product. Thus, conventional techniques for item replenishment include inefficiencies and inaccuracies which make accurate item replenishment difficult.

BRIEF DESCRIPTION OF THE DRAWINGS

Various embodiments in accordance with the present disclosure will be described with reference to the drawings, in which:

FIG. 8 illustrates examples of user interfaces for providing an instruction associated with test-enabled sensor data, in accordance with at least one embodiment;

FIG. 10 includes graphs which illustrate some improvements to sensor data accuracy, according to some embodiments;

DETAILED DESCRIPTION

Figure 1:
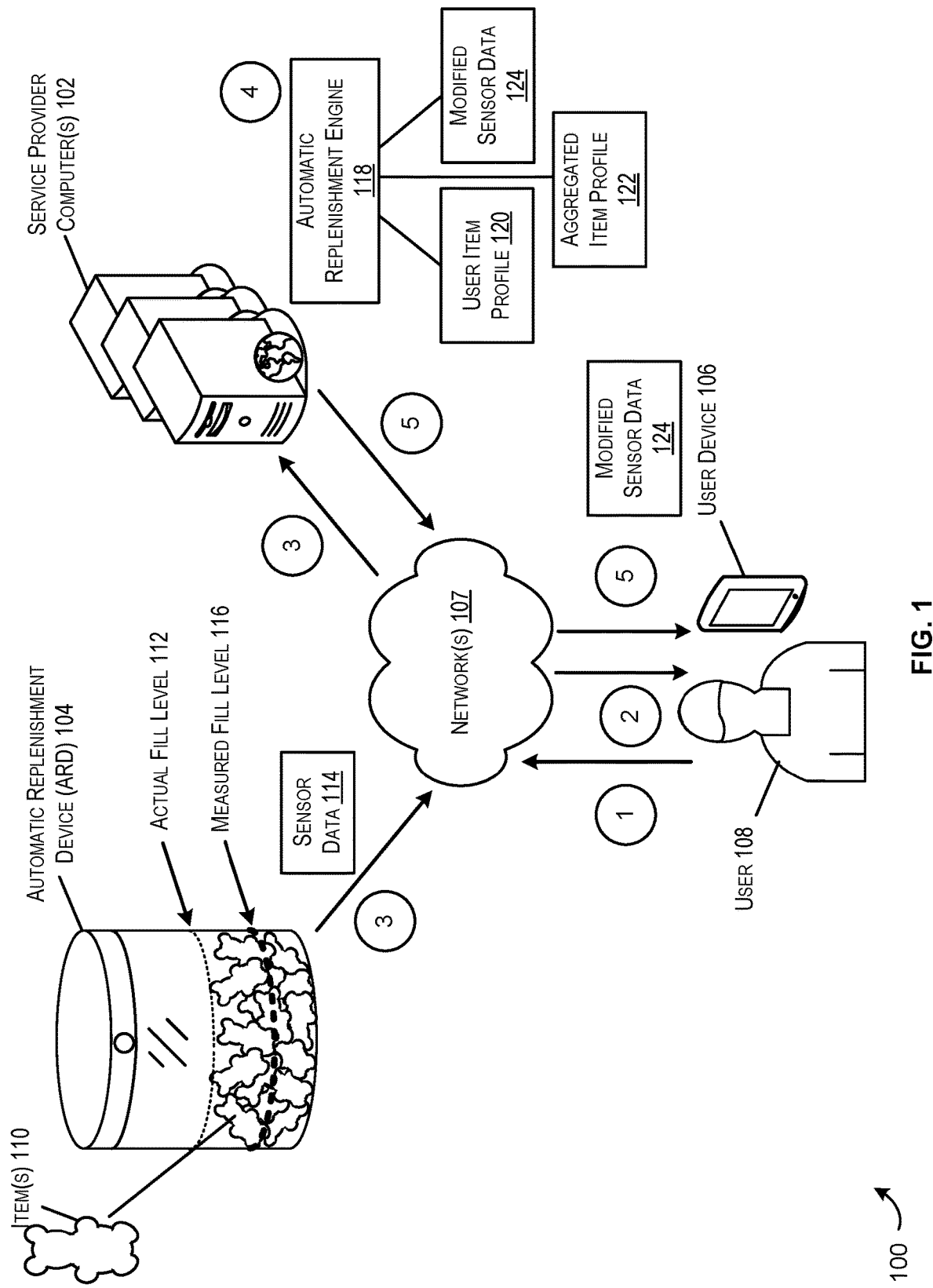
FIG. 1 illustrates a workflow for providing test-enabled sensor data that includes service provider computers, an automatic replenishment device (ARD), and a user device, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide systems and methods for providing sensor data corrections. In at least one embodiment, various sensors (e.g., time-of-flight (ToF) sensors) of an automatic replenishment device (ARD) may be utilized to collect sensor data related to an item stored by the ARD (e.g., situated on or within the ARD). A ToF sensor may resolve a distance based on the known speed of light, measuring the time-of-flight of a light signal between the sensor and an object. In some examples, the ARD may include a container and a lid. One or more ToF sensors may be affixed to the lid (or another suitable portion of the ARD). A ToF sensor may be configured to measure the distance between the sensor and an object (e.g., the bottom of a container of the ARD or an item situated on/within the container). The sensor may also be configured to output a signal return rate indicating an amount of light returning to the sensor from a given light emission.

In some embodiments, the sensor data may be provided (e.g., by the ARD) to one or more service provider computers. The service provider computers may utilize the sensor data to determine an amount, volume, and/or quantity of the item within the ARD (e.g., within the container). When the item within the ARD drops below a threshold amount, the service provider computers may perform one or more remedial actions. A remedial action may include, but is not limited to, presenting a current fill level of the item within the ARD, generating an order to replenish the item (e.g., to purchase an item from a provider and/or deliver the item to the user), providing a notification related to the fill level (e.g., via an email, a text message, a website, a push notification, etc.), or the like.

In some embodiments, the ToF sensors may include some degree of error. For example, such sensors may have difficulty producing accurate sensor data when the items within the ARD have some amount of transmissivity. "Transmissivity" is intended to refer to the degree to which a medium (e.g., an item) allows light to pass through it. Items that have at least some transmissivity (e.g., gummi bears, rice, noodles, cereal, beef jerky, etc.) may not be accurately "seen" by the sensors. Sensor data inaccuracies due to transmissivity may lead to inaccurate assessment/calculations with respect to how much of an item is remaining in the ARD. By way of example, a sensor collecting sensor data related to a volume of gummi bears may measure a distance that is inaccurately large given that the light emitted from the sensor was able to pass through the gummi bears to some degree. Should the inaccurately large distance measurement be used to calculate an actual fill level of the gummi bears within the ARD, the calculated fill level may be inaccurately low. Thus, a remedial action (e.g., fill level presentation, notification transmission, item replenishment, etc.) may occur that may unnecessarily waste processing resources, provide inaccurate data, and/or create an unpleasant user experience.

In some embodiments, sensor data collected when the fill level of the item is relatively low may be more accurate than when the fill level of the item is higher. This may be due to the sensor being able to sense the bottom of the ARD when the fill level approaches zero. Thus, sensor data associated with such items may be more accurate when the fill level of the item within the ARD is at or under a threshold amount (e.g., less than 10% full, 15% full, etc.).

The determination of the offset associated with the item may be maintained by the service provider computers. The predetermined mapping may identify an item, a material-specific offset associated with the item, and a material-specific signal return rate (SRR) associated with the item. A material-specific offset (also referred to as a "material-specific offset value," and a "measurement offset value") may refer to an amount of known and/or calculated sensor data error (e.g., 20%) associated with the item. A "material-specific SRR" may be a predetermined value that indicates an expected SRR when the specific item fills a particular amount (e.g., 20%) of a similar ARD. The values contained within the mapping may be derived from any suitable method such as, but not limited to, controlled testing, customer test measurement, machine learning (e.g., prediction from similar materials), or the like.

The system may identify a state for a particular item stored with the ARD. The state for the item may correspond with a verified good state, a verified corrected state, a verified bad state, or an unverified state. Each of these states, in some examples, may correspond with the determined material-specific offset, based at least in part on a plurality of sensor data received from a plurality of ARDs for the items.

For example, the system may prompt the user for input in order to calculate a material-offset value for the item of a particular type. As a sample illustration, the user may be prompted to fill the ARD to some amount (e.g., 20%, 30%, etc.). The sensor(s) of the ARD may be stimulated (e.g., via user input, via input provided at the ARD such as closing a lid, initiated by the service provider computers, etc.) to collect sensor data for the item. Given that the fill level (e.g., 20%) is known, the sensor data collected may be utilized to determine the material-offset for the item. That is, if the sensor data is used to calculate an estimated fill level of 35%, the system may determine that the material-offset for the item is 15% (e.g., indicating an error of approximately 15%). In some embodiments, material-offset values calculated in this manner may be added to the mapping at any suitable time such that the calculated material-offset value for the item may be retrieved from the mapping rather than being recalculated for future operations.

When there is a difference between the estimated fill level and the material-offset value for the item within a threshold offset value (e.g., within 0-5%, etc.), the state of the item may correspond with a verified good state. For example, the sensor data received from the ARD may accurately define the fill level of the item in a storage associated with the ARD without associating the fill level with an offset value, which may be consistent across multiple ARDs within a predefined range. The accurate definition of the fill level may identify measured fill level by the sensor data being within the predefined range of an expected fill level, without relying on an offset value. In another example, this accurate definition of the fill level of the item may correspond with transmissivity less than a threshold transmissivity value of the item remaining in the ARD. Illustrative items with the verified good state may correspond with ground coffee, coffee beans, flour, solid-material containers, pet treats, and nuts.

When there is a difference between an estimated fill level and a material-offset value for the item is repeatable across a plurality of ARDs and a determination of the difference between these values is within a threshold offset value, the state of the item may correspond with a verified corrected state. For example, first sensor data received from a first ARD may identify a fill level that is 15% different than the expected fill level for first ARD. Second sensor data received from the second ARD may also identify a fill level that is 15% different than the expected fill level for second ARD. When the differences between the expected fill level and the sensor data from the plurality of ARDs is within a threshold offset value (e.g., within 0-5%, etc.), the determination of the offset for this particular item may be consistent and stored in an item profile. In some examples, the offset values may be aggregated (e.g., average, mean, standard deviation, etc.) to determine a single offset value for the item corresponding with the verified corrected state. Illustrative items with the verified corrected state may correspond with gummy candy, pasta, cereal, some pet treats, laundry pods, and beef jerky.

For the verified corrected state, the offset value may be stored with a user item profile and, when the offset is confirmed for more than one user, the offset may be stored with an aggregated item profile. The user item profile may include the material-offset for the item and may be applied for that particular user that provided the sensor data in association with the expected fill level. Over time or various collections of sensor data for the same type of item from multiple users, an aggregated material-offset may be identified for the same type of item for future users and stored with an aggregated item profile. The material-offset for the item may be within a threshold value from multiple sources before determining that the material-offset is the proper value for the item and stored with the aggregated item profile.

When comparing the expected fill value with the raw sensor data, the measured fill value may be outside of a first predefined range (e.g., the two values are more than 5% different). However, the comparison of these two values may be consistent across multiple ARDs. The consistency of these two values being outside of the first predefined range may be expected, and thus satisfy a second predefined range (e.g., out of all the ARDs tested, 95% of them provide sensor data for this item that is outside the first predefined range). This relationship to the two predefined ranges may correspond with the verified corrected state.

As a sample illustration, a first predefined range of the difference between the expected fill level and the measured fill level may correspond with 0-5%. In the illustration above, the first sensor data received from a first ARD is 15% different than the expected fill level for first ARD and the second sensor data received from the second ARD is 15% different than the expected fill level for second ARD. Both of these measurements are outside the first predefined range. In this example, a second predefined range may also be determined when comparing the difference between the expected fill level and the sensor data. When comparing the offset values to this second predefined range, the same or similar 15% values from the first ARD and the second ARD may be within the second predefined range (e.g., 0-40%).

When there is a difference between an estimated fill level and a material-offset value for the item is repeatable across a plurality of ARDs and a determination of the difference between these values exceeds a threshold offset value, the state of the item may correspond with a verified bad state. For example, first sensor data received from a first ARD may identify a fill level that is 15% different than the expected fill level for first ARD. Second sensor data received from the second ARD may also identify a fill level that is 30% different than the expected fill level for second ARD. Third sensor data received from the third ARD may also identify a fill level that is 45% different than the expected fill level for third ARD. When the differences between the expected fill level and the sensor data from the plurality of ARDs is outside a threshold offset value (e.g., within 0-5%, etc.), the determination of the offset for this particular item may not be determined.

In this example, the difference between the expected fill level and the actual fill level for the first ARD is 15%, the difference between the expected fill level and the actual fill level for the second ARD is 30%, and the difference between the expected fill level and the actual fill level for the third ARD is 45%. When comparing the expected fill value with the raw sensor data for each of these ARDs, the measured fill value may be outside of a first predefined range (e.g., the two values are more than 5% different because they are 15%, 30%, and 45%). Additionally, the comparison of the expected fill value with the raw sensor data is inconsistent across multiple ARDs. When a second predefined range is used to compare the similarities between the expected fill value with the raw sensor data across multiple ARDs (e.g., 0-40%, etc.), these compared values may also be outside of a predetermined range. Thus, both the first predefined range and the second predefined range are violated in this example. The offset for the item may be too inconsistent to propagate to all material-offset value for this particular item. In some examples, the material-offset value may be stored for a particular ARD and not stored with a plurality of ARDs storing the same type of item. In some examples, the aggregated item profile may identify the item as being associated with a verified bad state. Illustrative items with the verified bad state may correspond with liquids, spaghetti, full-sized candy bars, and long/rope candy.

When there is a difference between an estimated fill level and a material-offset value for the item is not repeatable across a plurality of ARDs, the state of the item may correspond with an unverified state. For example, only one ARD may correspond with storing a particular type of item. While the state of the item is unverified, the user item profile may correspond with a single ARD and the material-offset value for the item may not be propagated to other ARDs storing the same type of item. In some examples, the aggregated item profile may be blank or not yet generated for the particular item.

In some examples, sensor data (e.g., including a distance measurement and a measured SRR, etc.) may be provided to the service provider computers from the ARD. Upon receipt, the service provider computers may be configured to consult the mapping to obtain a material-specific offset. The mapping may indicate that a particular item (e.g., gummi bears) is associated with a material-specific offset of 20% (indicating that distance measurements of gummi bears typically contains a 20% error). The service provider computers may be configured to add the material-specific offset to the measured distance provided in the sensor data to compensate for the error. The offset scale enables the sensor data to be adjusted such that accurate fill levels may be calculated even when the ARD is approaching empty. Further examples are disclosed in U.S. patent application Ser. No. 15/926,779, filed Mar. 20, 2018, and titled "PRODUCT SPECIFIC CORRECTION FOR A SENSOR-BASED DEVICE," the entire disclosure of which is herein incorporated by reference.

Techniques described herein relate to correcting sensor data associated with items with some amount of transmissivity in order to avoid wasteful processing and/or presenting misleading fill level information due to inaccurate sensor data. In at least one embodiment, sensor data may be transmitted (e.g., by the ARD) to one or more service provider computers. The service provider computers may be configured to correlate an offset associated with the transmissivity of a particular item that is associated with the ARD (e.g., via a user profile maintained by the service provider computers). By applying the offset value across multiple ARDs, the wastefully processing and presenting of misleading fill level information may be reduced.

FIG. 1 illustrates a workflow 100 for providing sensor data corrections that includes service provider computer(s) 102, an automatic replenishment device (ARD) 104, and a user device 106, in accordance with at least one embodiment. The service provider computer(s) 102, the ARD 104, and the user device 106 may be configured to communicate with one another via network(s) 107 (e.g., a local area network, a wide area network, a cellular network, the Internet, or the like) via any suitable communications protocol.

Prior to performance of the workflow 100, the user 108 may utilize any suitable means for obtaining an item(s) 110 (e.g., some number of gummi bears). For example, the user 108 may utilize to browse an electronic marketplace for gummi bears. The electronic marketplace may be hosted by the service provider computer(s) 102 and/or another suitable system. Utilizing interfaces provided by the electronic marketplace, the user 108 may purchase the gummi bears which may then be delivered to the user 108 utilizing any suitable shipping methods. It should be appreciated that the item(s) 110 may be obtained using other means (e.g., purchased from a retail store, received as a gift, etc.).

Once obtained, the item(s) 110 may be placed on/in the ARD 104. In some embodiments, the ARD 104 may include a container and a lid as depicted in FIG. 1. The lid may include one or more time-of-flight (ToF) sensors. Once placed within the ARD 104 as depicted in FIG. 1, the item(s) 110 may fill the ARD 104 to some level (e.g., an actual fill level 112).

At step 1 of the workflow 100, the user 108 may utilize the user device 106 to perform a process for associating the item(s) 110 with the ARD 104. For example, the user device 106 may be utilized to access an application and/or website (e.g., hosted by the service provider computer(s) 102) to perform an association process. During the association process, the user device 106 (e.g., via the application and/or website) may be utilized to provide account information such as a name, a shipping address, billing information, or the like. Alternatively, the user device 106 may be utilized to sign in to a user profile maintained by the service provider computer(s) 102 in order to access previously stored account information.

During the association process, the user device 106 may be utilized to associate the item(s) 110 with the ARD 104. As a non-limiting example, an identifier (e.g., a serial number, bar code, or other suitable identifier) of the ARD 104 may be entered, scanned, and/or selected at the user device 106. An item identifier may also be entered, scanned, and/or selected at the user device 106. The user device 106 may then be utilized to provide an indication that the item identifier of the item(s) 110 is to be associated with the identifier of the ARD 104. The association between the item(s) 110 and the ARD 104 may be stored by the service provider computer(s) 102 (e.g., as part of the user profile associated with the user 108 and/or user device 106). In the example depicted in FIG. 1, the item(s) 110 may include some amount of transmissivity.

It should be appreciated that, in some examples the user 108 and the user device 106 may not perform the association process at step 1. For example, a camera or other suitable sensor located on the ARD 104 may be utilized to collect sensor data that may be utilized to identify (e.g., by the service provider computer(s) 102 via image recognition techniques) the particular item currently being stored within the ARD 104. Once an item has been identified via the sensor data, the service provider computer(s) 102 may be configured to create an association between the item being stored and the ARD 102. Thus, the process for associating the item and the ARD 104 may be performed independent of the user 108 and/or the user device 106.

At step 2 of the workflow 100, the service provider computer 102 may transmit an instruction to the user device 106 to fill a storage associated with the ARD 104 with items 110 to a measured fill line 116. As a sample illustration, the instruction may be received by the user device 106 and displayed at the user interface of the user device 106 that illustrates the measured fill line 116 of the ARD 104. This may prompt the user 108 to pour items 110 into the storage associated with the ARD 104 to the illustrated fill line. Sample illustrations of the user interface and corresponding instructions are provided at FIGS. 5-8.

At step 3 of the workflow 100, sensor data 114 may be transmitted by the ARD 104 (e.g., via one or more ToF sensors of the ARD 104). The sensor data 114 may be collected and/or at any suitable time according to a predetermined schedule, at periodic time intervals, upon sensing user interaction with the item(s) 110 and/or the ARD 104, upon user input entered at the ARD 104, upon instruction from the service provider computer(s) 102 and/or the user device 106, or at any suitable time. The sensor data 114 may indicate a distance measurement that corresponds to the measure fill level 116.

The service provider computer(s) 102 may receive the sensor data 114. The sensor data 114 may include a measured distance between the sensor and the item(s) 110 and a signal return rate (SRR) indicating some amount of light returned to the sensor given a particular light emission. The service provider computer(s) 102 may include an automatic replenishment engine 118. The service provider computer(s) 102 may expect to receive an amount of items at a first value and receive an amount of item (according to the measured distance between the sensor and the item(s) 110 and a signal return rate (SRR), etc.) at a second value.

At step 4, the automatic replenishment engine 118 may determine a user item profile 120. The user item profile 120 may identify the measured distance between the sensor and the item 110 and/or the received SRR received at step 3. The user item profile 120 may correspond with a single type of item for a single user or multiple items for the single user.

In some examples, the user item profile 120 may be used to store offset data for the item until multiple users can confirm substantially similar data for the item. This may include identifying the state of the item. For example, the sensor data received from the ARD may accurately define the fill level of the item in an ARD (e.g., when an ARD is a complete storage container with a lid) or in a storage associated with the ARD (e.g., when an ARD corresponds with a lid and the storage container is separate from the identified ARD) without associating the fill level with an offset value. The user item profile 120 may identify the state of the item as a verified good state. When sensor data received from more than one ARD accurately defines the fill level of the same item in the ARD (or storage containers associated with the ARD) without associating the fill level with an offset value, the state of the item may be updated in the aggregated item profile 122 as well. The aggregated item profile 122 may also identify the state of the item as a verified good state.

When a plurality of sensor data for the single type of item exceeds a threshold number of ARDs and any differences between the measured sensor data is repeated (or within a threshold of each other), the user item profile 120 may be stored as aggregated item profile 122. The aggregated item profile 122, in some examples, may correspond with all items of the particular type stored in any ARD and identify the measurement offset value for these items. In some examples, the user item profile 120 may be archived or deleted when the aggregated item profile 122 is generated. The offset and sensor data for a user may access the aggregated item profile 122, rather than a user item profile 120, when the plurality of sensor data for the single type of item exceeds a threshold number of ARDs.

The aggregated item profile 122 may comprise a state, offset, and material SRR associated with an item. The aggregated item profile 122 may be generated when a threshold number of consistent sensor data measurements verify an item (e.g., based on an aggregate the user item profiles 120 into a single aggregated item profile 122 that can be used by all users). The calculation may include removing or not removing outliers from the user item profiles.

The threshold number of consistent sensor data measurements can be determined several different ways. For example, when the absolute difference or the standard deviation between offset and/or material SRR is less than a threshold value, the sensor data from a plurality of ARDs may be considered consistent. In another example, when the number of sensor data sources are within a static difference range (e.g., within five of each other, etc.) or the number of sensor data sources exceed a threshold value (e.g., at least three sensor data sources, etc.), the sensor data from a plurality of ARDs may be considered consistent.

In another example, the consistent sensor data measurements may be calculated using a t-statistic to estimate the true population mean from a sample of the population with a given confidence. As a sample illustration, the confidence value may correspond with 95% and the sample mean offset may be within 6 mm (~%5 error) of the population mean offset. The difference at the 95% confidence value may correspond with the sample mean SRR being within 0.05 of the population mean SRR (e.g. returning a left-tailed inverse of a user's t-distribution). In some examples, the confidence value may be within a threshold value of the population mean offset, rather than an absolute value. As a sample illustration, the sample mean offset may be within a threshold value (e.g., 5% error) of the population mean offset when the sample mean offset is calculated at 6 mm.

The automatic replenishment engine 118 may also generate modified sensor data 124 from the sensor data 114 received at step 3. For example, the automatic replenishment engine 118 may calculate an offset scale based at least in part on the received SRR, a predetermined empty container SRR, and a predetermined material-specific SRR. The offset scale may be a value between 0 and 1. Once determined, the offset scale may be applied to a material-specific offset value associated with the item(s) 110. The automatic replenishment engine 118 may add the scaled material-specific offset value to the measured distance received at step 3 to calculate an adjusted distance measurement. The automatic replenishment engine 118 may then perform operations to convert the adjusted distance measurement to a calculated fill level for the item(s) 110 in the ARD 104. The modified sensor data 124 may be calculated in this fashion so as to provide a fill level than more closely matches the actual fill level 112 than the measured fill level 116 indicated by the sensor data 114.

At step 5, the modified sensor data 124 may be provided by the service provider computer(s) 102 via the network(s) 107. For example, the service provider computer(s) 102 may present the calculated fill level of the item(s) 110 within the ARD 104 at an application and/or website hosted by the service provider computer(s) 102. The modified sensor data 124 may be provided/rendered at the user device 106 for display to the user 108. Thus, the user 108 may view the calculated fill level of the item(s) 110 with the ARD 104 via user device 106.

Although not depicted in FIG. 1, many additional or alternative workflows are contemplated. For example, the modified sensor data 124 may be utilized by the automatic replenishment engine 118 to cause performance of any suitable number of remedial actions including notifying the user 108 of the calculated fill level via the user device 106, generating an order for the item(s) 110 based at least in part on the calculated fill level, etc.

If the sensor data 114 is used rather than the modified sensor data 124, the automatic replenishment engine may perform any of the various remedial action discussed based on the measured fill level 116. By utilizing the modified sensor data 124 and the corresponding calculated fill level which more closely matches the actual fill level 112, the user 108 may be presented/provided a more accurate view of the amount of the item(s) 110 left in the ARD 104. Additionally, by utilizing the more accurate modified sensor data 124 the automatic replenishment engine 118 may avoid needless processing of one or more remedial actions (e.g., generating an order) that may have been caused by the inaccuracies of the sensor data 114.

Figure 2:
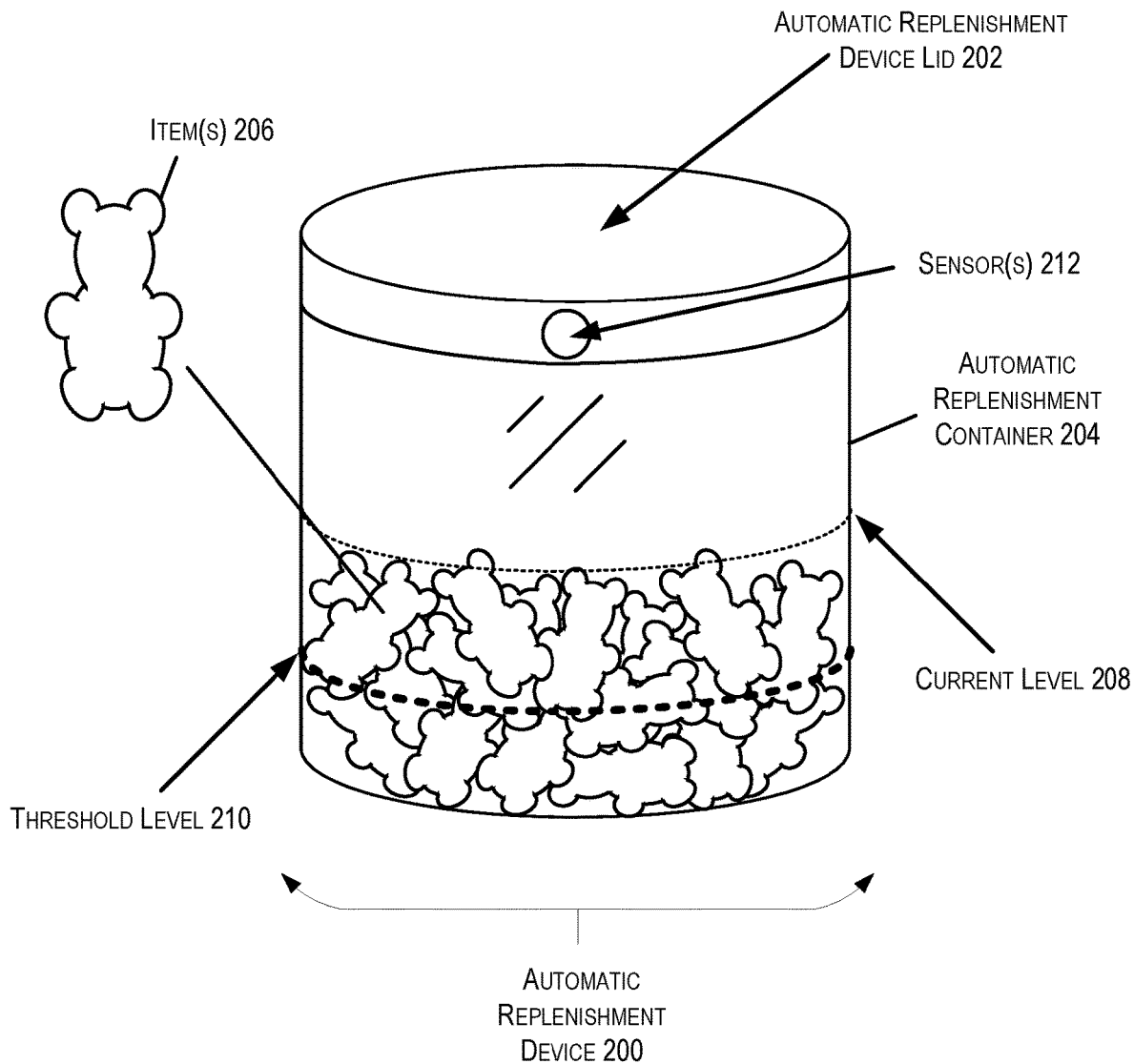
FIG. 2 illustrates an example ARD with items placed within the ARD, in accordance with at least one embodiment.

FIG. 2 illustrates an example ARD with items placed within the ARD, in accordance with at least one embodiment. FIG. 2 includes ARD 200 (e.g., an example of the ARD 104 of FIG. 1) that includes an ARD lid 202, and an ARD container 204. One or more item(s) 206 (e.g., gummi bears, coffee grounds, liquid detergent, flour, candy, pretzels, rice, etc.), may be stored within the ARD container 204. FIG. 2 also includes visual representations for a current level of the item(s) 206 at 208 and a threshold level 210. It should be noted that although the ARD 200 of FIG. 2 includes visual representations of a current level of item at 208 and a threshold level 210, these depictions are for clarification of aspects of the embodiments described herein. For example, a current level of item 208 may be determined by service provider computer(s) 102 of FIG. 1 based on sensor data obtained by sensor(s) 212 and maintained in a user item profile or aggregated item profile that is generated and stored by the service provider computer(s) 102. As described herein, the threshold level 210 may be determined by the service provider computer(s) 102 based on the consumption data that is derived from the sensor data obtained by the sensor(s) 212 where the threshold level 210 is stored and associated with a user item profile or aggregated item profile maintained by the service provider computer(s) 102.

It should be noted that the ARD 200 of FIG. 2 represents a container which may be of any shape, depth, or size, in which item(s) 206 are placed within. In embodiments, the ARD 200 may include one or more sensor(s) 212 that may be configured to determine a distance of the item(s) 206 that are currently situated within the ARD container 204 of the ARD 200 (i.e., capture or obtain distance measurements between the one or more sensor(s) 212 and the item(s) 206). The sensor(s) 212 may include a time of flight sensor (e.g., a time of flight camera, a time of flight transmitter and receiver combination, etc.), that is configured to determine/detect a distance/amount of item(s) 206 placed in the ARD container 204 of the ARD 200 based at least in part on the time of flight for a signal to be emitted from the one or more sensor(s) 212 to a current level of the item(s) 206 (e.g., 208) or to a surface area of the item(s) 206. In accordance with at least one embodiment, the sensor data collected by the one or more sensor(s) 212 may include distance measurements identifying a distance between the item(s) 206 and one or more sensor(s) 212. The sensor data may include the raw data that was obtained by the sensor(s) 212 and/or the sensor data may include values that represent a conversion from the raw data to any suitable format and/or unit of measurement.

The sensor data may indicate a current distance, amount, and/or volume of the item(s) 206 situated within the ARD container 204. For example, the sensor data may indicate a current distance (e.g., 140 mm, 5.5 inches, etc.) between the one or more sensor(s) 212 and the item(s) 206. The sensor data may indicate a current a current volume of the item(s) (e.g., 57.75 cubic inches, 39.23 cubic inches, etc.) and/or an item number or quantity that indicates a number or quantity of the item(s) 206 situated within the ARD container 204 of ARD 200. The ARD 200 and sensor(s) 212 may be configured to utilize any suitable time of flight signal technology between the sensor(s) 212 and the item(s) 206. Although the ARD 200 of FIG. 2 includes the sensor(s) 212 within or on a surface of the ARD lid 202, the sensor(s) 212 may be placed on one or more interior surfaces of the ARD container 204. In at least one embodiment, the ARD lid 202 may be configured to be placed on any suitable container.

Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensor(s) 212 and item(s) 206 (e.g., current level of item 208) utilizing a source/detector or transmitter/receiver. In embodiments, the service provider computers may be configured to determine a distance from the sensor(s) 212 and item(s) 206 (e.g., current level of item 208) using the sensor data obtained by the sensor(s) 212.

For example, the elapsed time period between the transmission of a signal from a source to detection of the signal (e.g., from the sensor(s) 212), or at least a portion thereof, at a detector or receiver, along with the known speed of the signal (e.g., the speed of light) may be utilized to determine the distance between the source of the signal (e.g., sensor(s) 212) and the item(s) 206. The ARD 200 may be configured to transmit the sensor data obtained by sensor(s) 212 to a remote computing device separate from the ARD 200 (e.g., the service provider computer(s) 102 of FIG. 1, a cloud-based server/service, etc.). In some embodiments, the remote computing device may be configured to utilize the sensor data to calculate the distance between the sensor(s) 212 and the current level of item 208 and correlate the distance to a volume, amount, and/or quantity of the item(s) 206 left in the ARD container 204. The sensor data may be used to determine the consumption data or consumption rate of item(s) 206 and in embodiments reorder the item(s) 206 upon the amount of the item being equal to or less than the threshold level 210.

Figure 3:
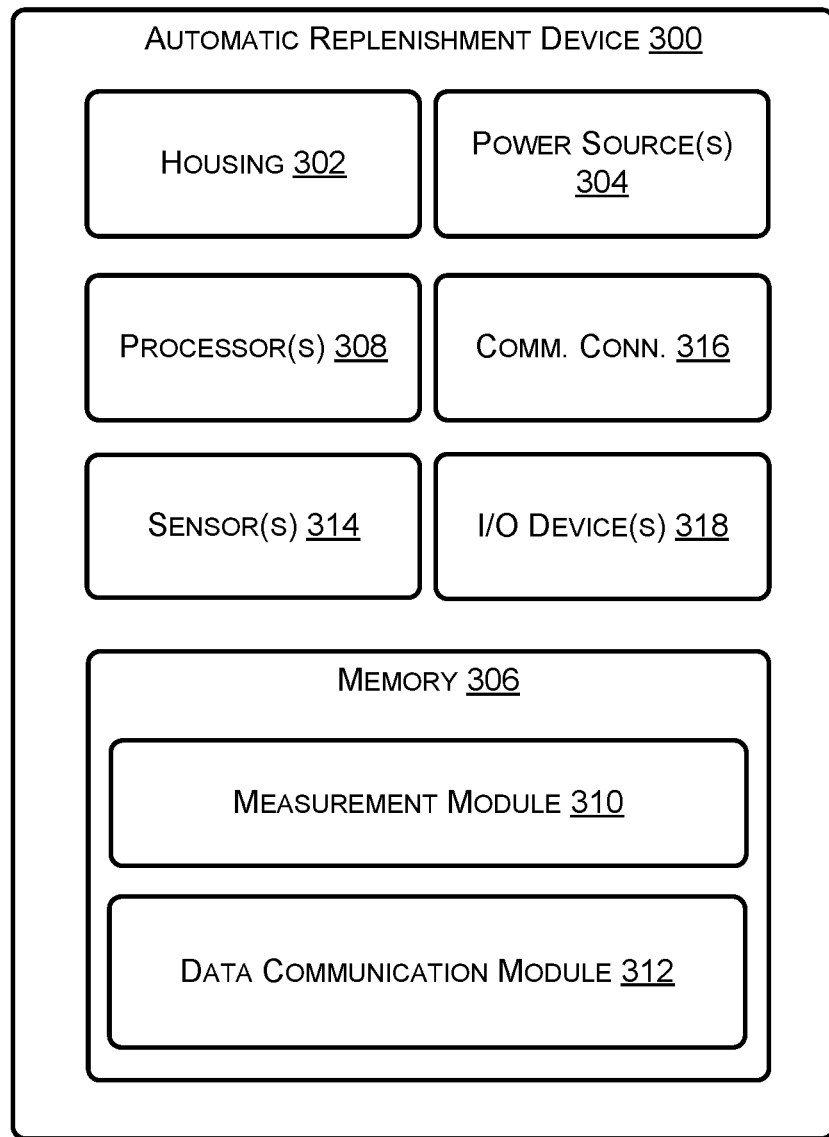
FIG. 3 illustrates a block diagram of components of an ARD, in accordance with at least one embodiment.

FIG. 3 illustrates a block diagram of components of an ARD, in accordance with at least one embodiment. The ARD 300 of FIG. 3 may be an example of the ARD 104 and ARD 200 of FIGS. 1 and 2, respectively. The ARD 300 (or a portion of the ARD 300 such as the ARD lid 202 of FIG. 2) may include a housing 302 that may include components of ARD 300 discussed further below. In embodiments, the housing 302 may be composed of any type of material (e.g., plastic, metal, etc.), and may serve to prevent the components of the ARD 300 from being damaged or interacting or otherwise contaminating the items placed within ARD 300.

The ARD 300 may include one or more power source(s) 304 that provide power to one or more components of the ARD 300. The power source(s) 304 may include a battery, which may include a one-time use battery or a rechargeable battery. However, the power source(s) 304 may rely on power from another source providing alternating current (AC) power and may be a power inverter. For example, the ARD may be powered via a power cord that is coupled to the ARD 300 and that is detachably connected to a power outlet, such as a wall outlet. In some embodiments, the ARD 300 may include a power level detector that is configured to determine and display a power level for the ARD 300 using alpha-numeric characters that indicate a current power level of a battery of the ARD 300 and power source(s) 304. The power level may be transmitted by the ARD 300 to a remote computing device (e.g., the service provider computer(s) 102 of FIG. 1), which may track the power level of the power source(s) 304 over time. In some embodiments, the ARD 300 and/or the remote computing device may provide a notification (e.g., to a client device not pictured) of the power level via any suitable means such an e-mail message, a text message, a mobile application, a website, etc.

The ARD 300 may include at least one memory (e.g., memory 306) and one or more processing units (e.g., processor(s) 308). The processor(s) 308 may be implemented as appropriate in hardware, computer-executable instructions, software, firmware, or combinations thereof. Computer-executable instruction, software or firmware implementations of the processor(s) 308 may include computer-executable or machine-executable instructions written in any suitable programming language to perform the various functions described.

The memory 306 may include more than one memory and may be distributed throughout the ARD 300. The memory 306 may store program instructions (e.g., related to the measurement module 310 and/or the data communication module 312) that are loadable and executable on the processor(s) 308, as well as data generated during the execution of these programs. Depending on the configuration and type of memory, the memory 306 may be volatile (such as random access memory (RAM)) and/or non-volatile (such as read-only memory (ROM), flash memory, or other memory). In some implementations, the memory 306 may include multiple different types of memory, such as static random access memory (SRAM), dynamic random access memory (DRAM), or ROM.

Turning to the contents of the memory 306 in more detail, the memory 224 may include one or more application programs, modules or services for implementing the features disclosed herein including measurement module 310 and/or the data communication module 312. The measurement module 310 may include instructions that, when executed by the processor(s) 308 may cause the sensor(s) 314 to capture sensor data including distance measurements associated with the items placed on, or within, the ARD 300. A distance measurement may quantify a distance between the sensor(s) 314 and the item on/within the ARD 300. The memory 306 may be configured to store the collected sensor data. In some embodiments, the measurement module 310 may be configured to convert raw sensor data into any suitable format and/or unit. The measurement module 310 may be configured to provide sensor data and/or converted sensor data to the data communications module 312.

In some embodiments, the data communication module 312 may include instructions that, when executed by the processor(s) 308, transmit and receive data via communication connection(s) 316. The communication connection(s) 316 may include suitable communication interfaces for communicating via Bluetooth (Bluetooth Low Energy (BLE)), Wi-Fi, a cellular connection (e.g., 3G, 4G, LTE, etc.). The communication connection(s) 316 may be configured to transmit the data to a remote computing device (e.g., the service provider computer(s) 102 of FIG. 1) or relay data to the remote computing device using a proxy device (e.g., a smartphone, a laptop, a desktop computer, or any suitable device capable of performing data transfers with the remote computing device). The communication connection(s) 316 any may utilize known or widely used communication protocols such as a wireless connection (Wi-Fi network), a wired connection to a network, cellular network, short-range or near-field networks (e.g., Bluetooth), infrared signals, local area networks, wide area networks, the Internet, etc.

In at least one embodiment, the data communication module 312 may be configured to obtain sensor data from the measurement module 310 and/or the memory 306. The data communication module 312 may be responsible for transmitting such sensor data to a remote computing device (e.g., the service provider computer(s) 102) according to any suitable communications protocol. The sensor data may be communicated in any manner, such as via Bluetooth (Bluetooth Low Energy (BLE) may also be considered when using the term "Bluetooth"), Wi-Fi, a cellular connection (e.g., 3G, 4G, LTE, etc.), and so on.

In at least one embodiment, the data communication module 312 may be configured to receive data via the communication connection(s) 316. For example, the data communication module 312 may be configured to receive item information (e.g., an item identifier, unit weight, material consistency, or any suitable attribute of an item) indicating an item that is placed on, or within, the ARD 300. In some embodiments, the item information or other suitable information communicated to the data communication module 312 may include/indicate conversion algorithms for converting raw sensor data into a particular format and/or unit. In still further embodiments, the data communication module 312 may be configured to receive any suitable information for instructing the measurement module 310 in a manner of collecting sensor data utilizing sensor(s) 314. By way of example, an instruction may be received by the data communication module 312 and communicated to the measurement module 310 that indicates that sensor data is to be collected according to a provided schedule, at a particular periodic rate, or the like. Generally, any suitable data that is to be transmitted or received by the ARD 300 may be processed by the data communication module 312 and provided to any other module and/or component of the ARD 300.

The ARD 300 may include sensor(s) 314 such as a time of flight sensor, or other suitable sensors such as time of flight camera sensors, scale sensors, or infrared sensors that are configured to obtain or capture sensor data of items placed on and/or within the ARD 300. The time of flight sensors may include signal transmitters and receivers that are configured to determine an amount, quantity, and/or volume of an item stored on and/or within the ARD 300 or calculate a distance from the source of the signal to the receptor of the signal which can be converted into an amount of the item stored on and/or within the ARD 300 (e.g., in the ARD container 204 of FIG. 2).

The sensor(s) 314 may be configured to periodically obtain sensor data regarding the items placed on or within the ARD 300 at predetermined intervals, such as every day, every 12 hours, every 6 hours, every hour, every 15 minutes, and so on. In some embodiments, the sensor(s) 314 may determine/sense when an item is placed on or within the ARD 300, which may cause the sensor(s) 314 to obtain sensor data associated with the item(s). The sensor(s) 314 may also be instructed (e.g., by the measurement module 310) to obtain sensor data via instructions initiated at a remote computing device (e.g., the service provider computer(s) 102). The frequency of sensor data collection performed by the sensor(s) 314 may be adjusted over time, which may be based on the rate of consumption of the items and/or the manner in which the ARD 300 is being powered. For instance, if the ARD 300 is being powered via a power cord and power outlet, the sensor data may be obtained more frequently (e.g., every hour, every 15 minutes, etc.). However, if the ARD 300 is being powered using a battery, the sensor data may be collected less frequently to conserve battery life (e.g., once per day).

The ARD 300 may also include input/output (I/O) device(s) 318 and/or ports, such as for enabling connection with a keyboard, a mouse, a pen, a voice input device, a touch input device, a display, speakers, a printer, or other I/O device. The I/O device(s) 318 may be in any suitable form to enable data to be provided to any suitable component of the ARD 300 and/or for presenting information (e.g., text, lights, sounds) at the ARD 300 (e.g., via speaker, a display, haptic feedback, etc.).

Figure 4:
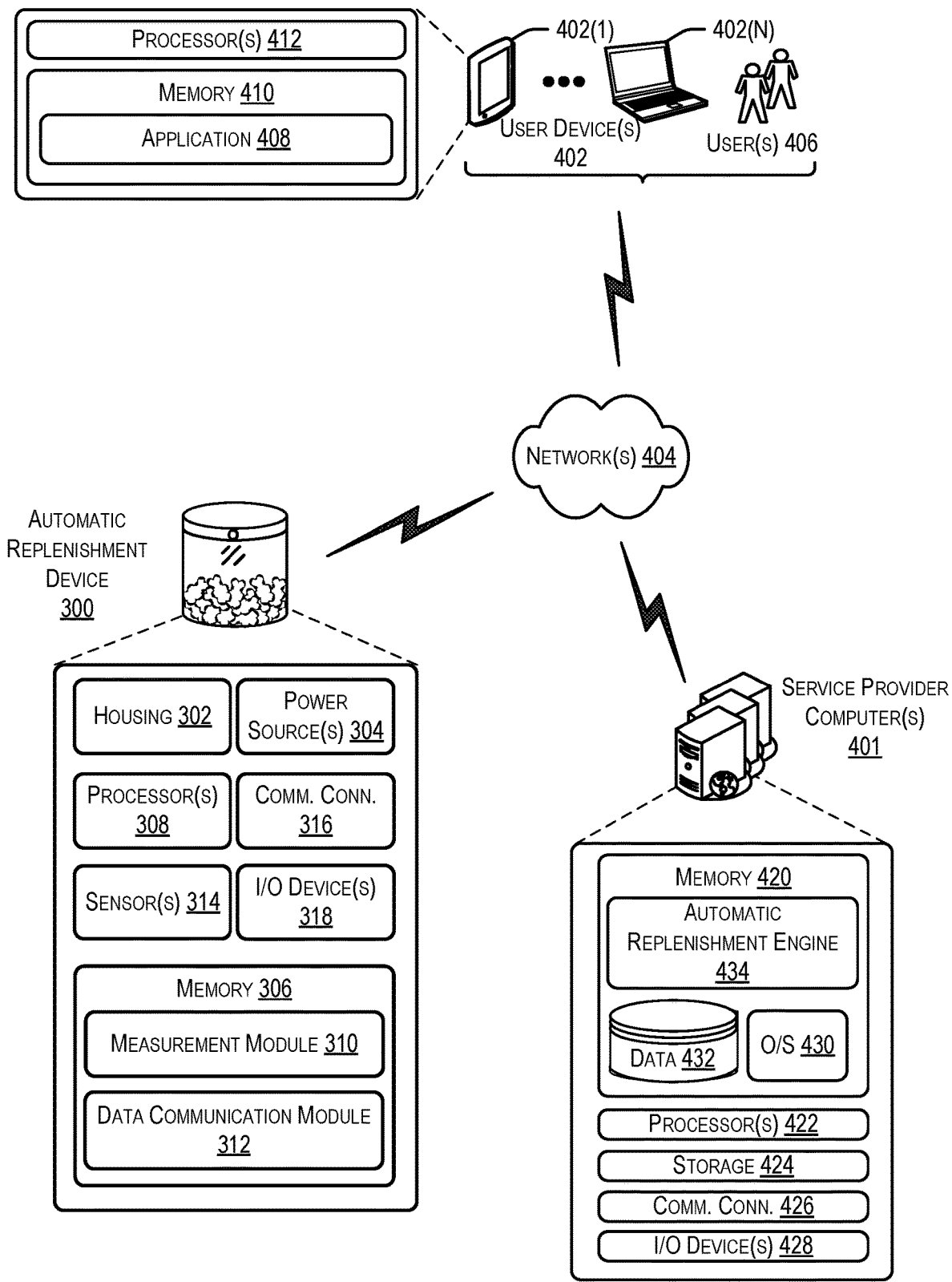
FIG. 4 illustrates an example architecture for providing test-enabled sensor data as described herein that includes one or more service provider computers, one or more user devices, and/or an ARD connected via one or more networks, in accordance with at least one embodiment.

FIG. 4 illustrates an example architecture 400 for providing product-specific sensor data corrections as described herein that includes one or more service provider computers 401 (e.g., the service provider computer(s) 102 of FIG. 1), one or more user devices 402, and/or an ARD (e.g., ARD 300) connected via one or more networks 404, in accordance with at least one embodiment. In architecture 400, one or more users 406 (e.g., customers, users, consumers, etc.,) may utilize user computing devices 402(1)-(N) (collectively, user devices 402) to access application 408 (e.g., a browser application, a shopping application, etc.) or a user interface (UI) accessible through the application 408. In embodiments, the user devices 402 may include one or more components for enabling the user(s) 406 to interact with the application 408.

The user devices 402 may include at least one memory 410 and one or more processing units or processor(s) 412. The memory 410 may store program instructions that are loadable and executable on the processor(s) 412, as well as data generated during the execution of these programs. Depending on the configuration and type of the user devices 402, the memory 410 may be volatile (such as random access memory (RAM)) and/or non-volatile (such as read-only memory (ROM), flash memory, etc.). The user devices 402 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 402. In some implementations, the memory 410 may include multiple different types of memory, such as static random access memory (SRAM), dynamic random access memory (DRAM), or ROM.

Turning to the contents of the memory 410 in more detail, the memory 410 may include an operating system and one or more application programs or services for implementing the features disclosed herein. Additionally, the memory 410 may include one or more modules for implementing the features described herein including the automatic replenishment module 414.

The architecture 400 may also include one or more service provider computers 401 (e.g., an example of the service provider computer(s) 102 of FIG. 1) that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 401 may implement or be an example of the service provider computer(s) described herein. The one or more service provider computers 401 may also be operable to provide site hosting, media streaming services, computer application development, and/or implementation platforms, combinations of the foregoing, or the like to the one or more users 406 via user devices 402.

In some examples, the networks 404 may include any one or a combination of many different types of networks, such as cable networks, the Internet, wireless networks, cellular networks, and other private and/or public networks. While the illustrated examples represent the users 406 communicating with the service provider computers 401 over the networks 404, the described techniques may equally apply in instances where the users 406 interact with the one or more service provider computers 401 via the one or more user devices 402 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 401 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 401 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 401 may be in communication with the user devices 402 and/or the ARD 300 via the networks 404, or via other network connections. The one or more service provider computers 401 may include one or more servers, perhaps arranged in a cluster or as individual servers not associated with one another.

In one illustrative configuration, the one or more service provider computers 401 may include at least one memory 420 and one or more processing units or processor(s) 422. The processor(s) 422 may be implemented as appropriate in hardware, computer-executable instructions, firmware, or combination thereof. Computer-executable instruction or firmware implementations of the processor(s) 422 may include computer-executable or machine-executable instructions written in any suitable programming language to perform the various functions described when executed by a hardware computing device, such as a processor. The memory 420 may store program instructions that are loadable and executable on the processor(s) 422, as well as data generated during the execution of these programs. Depending on the configuration and type of the one or more service provider computers 401, the memory 420 may be volatile (such as RAM) and/or non-volatile (such as ROM, flash memory, etc.). The one or more service provider computers 401 or servers may also include additional storage 424, which may include removable storage and/or non-removable storage. The additional storage 424 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 420, the additional storage 424, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 420 and the additional storage 424 are all examples of non-transitory computer storage media. Additional types of non-transitory computer storage media that may be present in the one or more service provider computers 401 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 401. Combinations of any of the above should also be included within the scope of non-transitory computer-readable media.

The one or more service provider computers 401 may also contain communication connection interface(s) 426 that allow the one or more service provider computers 401 to communicate with a data store, another computing device or server, user terminals, and/or other devices on the networks 404. The one or more service provider computers 401 may also include I/O device(s) 428, such as a keyboard, a mouse, a pen, a voice input device, a touch input device, a display, speakers, a printer, etc.

Turning to the contents of the memory 420 in more detail, the memory 420 may include an operating system 430, one or more data stores 432, and/or one or more application programs or services for implementing the features disclosed herein including the automatic replenishment engine 434 (e.g., an example of the automatic replenishment engine 118 of FIG. 1). In accordance with at least one embodiment, the automatic replenishment engine 434 may be configured to maintain a user profile associated with a user, determine a current fill level associated with an item situated on or within an ARD, correct error in sensor data received from an ARD, or the like. The automatic replenishment engine 434 will be discussed in further detail below with respect to FIG. 5.

The architecture 400 also includes the ARD 300 of FIG. 3. As disclosed herein, the ARD 300 may be configured, among other things, to utilize sensor(s) 314 to obtain sensor data associated with items situated on or within the ARD 300.

Figure 5:
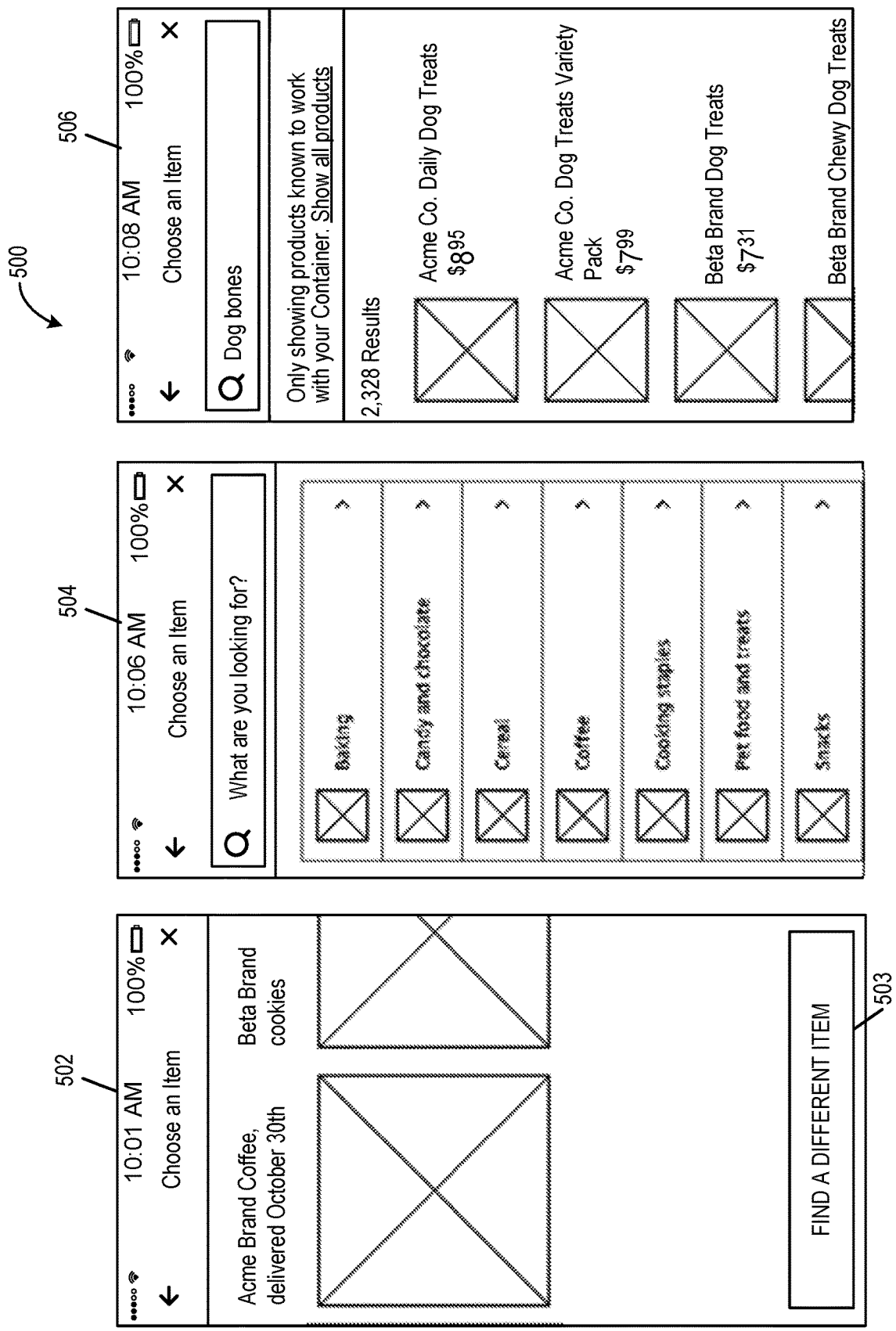
FIG. 5 illustrates examples of user interfaces for providing test-enabled sensor data, in accordance with at least one embodiment.

FIG. 5 illustrates examples of user interfaces for providing test-enabled sensor data, in accordance with at least one embodiment. In illustration 500, various user interfaces are provided that help provide an indication of an item from a user interface of a user device. The indication of the item may be transmitted from the user device to a service provider computer for further analysis.

For example, the item may be stored with a storage container associated with an ARD. The user may access a software application provided by the user device to identify the item that is stored in association with the ARD. The indication of the item may comprise a type, including a brand name, model number, or other attributes that may be used to identify the item (e.g., in terms of light transmissivity, weight, etc.). In some examples, when two items are of the same type and are stored in two, different ARDs, the first item may share one or more attributes that may be determined and/or assumed for the second item, without explicitly identifying the attributes of the second item (e.g., Acme Brand flour is stored in ARD 1 and ARD 2, etc.).

At 502, a first sample user interface is provided. For example, attributes identifying two items are displayed. The first item may be identified by a brand name ("Acme Brand"), a model ("coffee"), historical interaction data (e.g., order history, delivery history, "delivered October $30^{th}$"), and a representative image of the item. Similar attachments may be identified for the second item. In this example, the user may interact with the user interface (e.g., tap, select, etc.) to select an item that is stored with the ARD or activate a tool 503 to search for a different item.

At 504, a second sample user interface is provided. For example, the user may interact with the user interface to search for a particular item. The types of items may be aggregated so that the user may select a type of item and identify particular items that are associated with that type. For example, when a user selects "coffee" at the user interface, search results comprising any item associated with the type "coffee" in an item profile (e.g., user item profile or aggregated item profile, etc.) may be provided to the user interface in response to the selection. In other examples, the items may be filtered according to a user profile of the user device to further restrict the items that are displayed in search results that are also associated with the type "coffee" (e.g., only shows items from user's order history, etc.).

At 506, a third sample user interface is provided. For example, the user may interact with the user interface to search for a particular item by typing or otherwise providing a search query at the user interface. The user interface may update to identify any items corresponding with terms of the search query as search results and provide the search results as individually-selectable items at the user interface.

Figure 6:
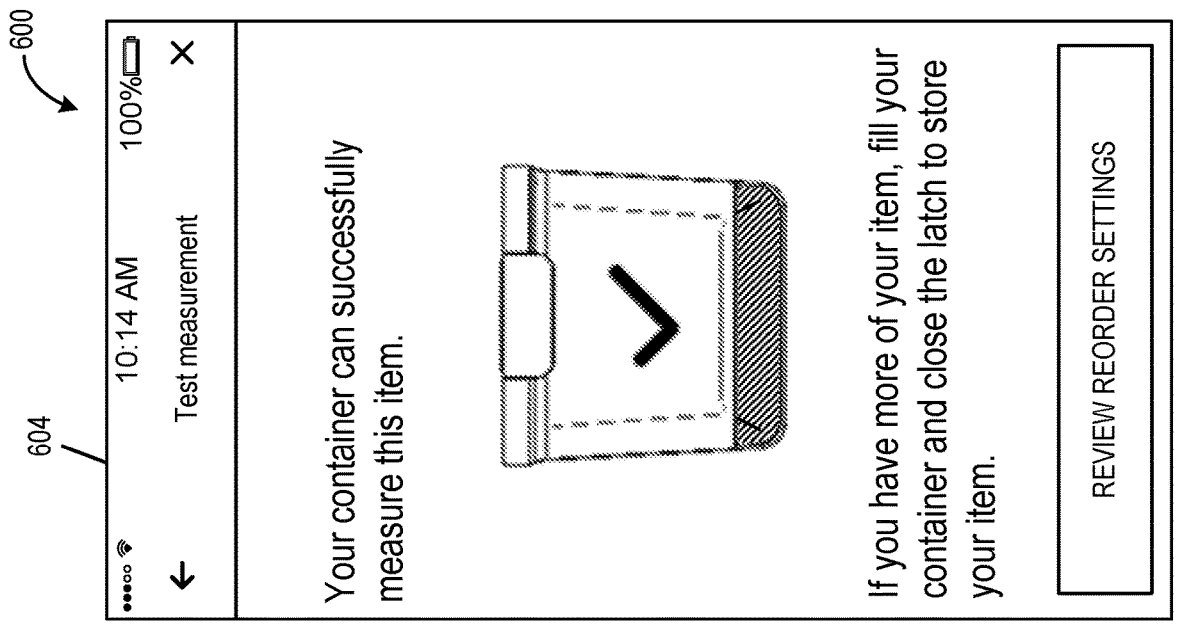
FIG. 6 illustrates examples of user interfaces for providing an instruction associated with test-enabled sensor data, in accordance with at least one embodiment.

FIG. 6 illustrates examples of user interfaces for providing an instruction associated with test-enabled sensor data, in accordance with at least one embodiment. In illustration 600, various user interfaces are illustrated that provide examples of an instruction that comprises an expected fill value of an item that fills some portion of an ARD.

At 602, a first instruction may be provided. The first instruction may request the user to fill a storage container to a marking with an item that will be stored in association with ARD. For example, the user may be prompted to fill the ARD to some amount (e.g., 20%, 30%, etc.). The sensor(s) of the ARD may be stimulated (e.g., via user input, via input provided at the ARD such as closing a lid, initiated by the service provider computers, etc.) to collect sensor data for the item.

The instruction may identify a visual representation of the item in the storage container and an expected fill value in comparison to the volume of the storage container. The instruction may direct the user to level the surface of the item within the storage container. In some examples, the instruction may direct the user to close the latch of the storage container to collect sensor data by the sensor of the ARD. The process of closing the latch on the storage container may activate the sensor to collect the measure distance value between the lid and the surface of item. Upon receiving an indication of the activation of the sensor, the sensor data may be transmitted to the service provider computer for further analysis.

At 604, a second instruction may be provided. The second instruction may comprise an indication that the container successfully measured the item. For example, after the sensor data has been transmitted to the service provider computer, the service provider computer may transmit the second instruction for presentation at the user interface that identifies that the sensor data has been received. Once the sensor data has been received, the second instruction may direct the user to continue filling the storage container with the item so that the storage container may store the item and track the use of item (e.g., for reordering purposes).

In some examples, the second instruction may correspond with the state for the particular item stored with ARD. The state for the item may correspond with a verified good state, a verified corrected state, a verified bad state, or an unverified state. Each of these states, in some examples, may correspond with the determined material-specific offset, received from either the user item profile (e.g., based at least in part on the user's individual sensor data for the item) or the aggregated item profile (e.g., based at least in part on a plurality of sensor data received from a plurality of ARDs for the items).

For example, at 604, the state of the item may correspond with a verified good state or a verified corrected state based at least in part on the identification of the item that has previously been associated with a zero value offset value or the identification of the item that has previously been associated with an pre-determined offset value. In either example, the amount of the item that fills some portion of the ARD may be determined, with or without an offset value, and confirmed by one or more sources of sensor data and ARDs that store the same type of item (e.g., determined from the aggregated item profile).

Figure 7:
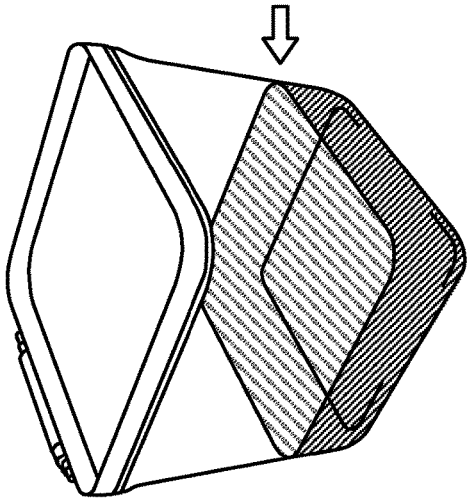
FIG. 7 illustrates examples of user interfaces for error checking test-enabled sensor data, in accordance with at least one embodiment.

FIG. 7 illustrates examples of user interfaces for error checking test-enabled sensor data, in accordance with at least one embodiment. In illustration 700, various user interfaces are illustrated that provide examples of error checking the amount of the item in the ARD in comparison to the expected fill value.

For example, a service provider computer may identify a discrepancy between the sensor data collected in response to a request to fill the storage container to the 20% fill value (e.g., as illustrated with FIG. 6). The discrepancy between the fill value and expected fill value may be expected, based at least in part on a valid offset value. For example, the sensor data may calculate an estimated fill level of 35% and the system may determine that the material-offset for the item is 15% (e.g., indicating an error of approximately 15%). When other ARDs associated with other users that store the same item type also provide sensor data that corresponds with the material-offset for the item around 15% (e.g., identified in the aggregated item profile), the measurement for the item may be verified, as illustrated in FIG. 6 at 604. However, when other ARDs associated with other users that store the same item type provide sensor data that corresponds with the material-offset for the item that is not 15% (e.g., exceeding an offset threshold of 10% as identified in the aggregated item profile, etc.), the service provider computer may identify the discrepancy and initiate the error checking process.

At 702, an instruction may be provided that requests the user a check of the amount of the item stored with the ARD. The instruction may correspond with the expected fill value illustrated with the user interface. For example, the user interface may have provided a first instruction that identifies the expected fill value at 20% and the user may have filled the storage container to a fill amount and locked the container using the latch. The service provider computer may receive sensor data comprising a measured distance value between the sensor and the first item.

The user interface may provide an instruction to confirm that the fill amount for the item with ARD is at 20%, as requested. The user may interact with the user interface to attempt to provide the fill amount that is closer to 20%, or confirm the fill amount by activating a tool 703. When a new amount is provided, the user may again lock the container using the latch or otherwise initiate the transmission of sensor data.

In some examples, the user may transmit a response indicating that the item cannot be filled to the 20% requested fill amount. A different expected fill value may be identified, as illustrated with FIG. 8.

At 704, a second discrepancy between the fill value and expected fill value may be identified. In some examples, the user interface may be updated to identify that the item cannot be measured accurately. This may correspond with a verified bad state of the item stored with an aggregated item profile.

FIG. 8 illustrates examples of user interfaces for providing an instruction associated with test-enabled sensor data, in accordance with at least one embodiment. In illustration 800, various user interfaces are illustrated that provide examples of an instruction that comprises an expected fill value of an item that fills some portion of an ARD.

At 802, a first instruction may be provided. The first instruction may direct the user to fill a storage container to a marking with an item that will be stored in association with ARD. For example, the user may be prompted to fill the ARD to a variable amount that the user specifies. This may be beneficial when the user does not have access to an expected fill value identified by the system. The sensor(s) of the ARD may be stimulated (e.g., via user input, via input provided at the ARD such as closing a lid, initiated by the service provider computers, etc.) to collect sensor data for the item.

The instruction may identify a visual representation of the item in the storage container and a movable, expected fill value in comparison to the volume of the storage container.

The user may adjust the tool 803 of the user interface to identify the expected fill value corresponding with the storage container.

At 804, a second instruction may be provided. The second instruction may comprise a confirmation that the fill amount in the storage container is the expected fill amount identified by the user by sliding the tool 803. In this illustration, the user has selected 80% as the expected fill value. The user may confirm the expected fill value and fills the storage container associated with ARD to the identified, expected fill value. Sensor data may be transmitted as described throughout the disclosure and, in some examples, stored with the user item profile.

Figure 9:
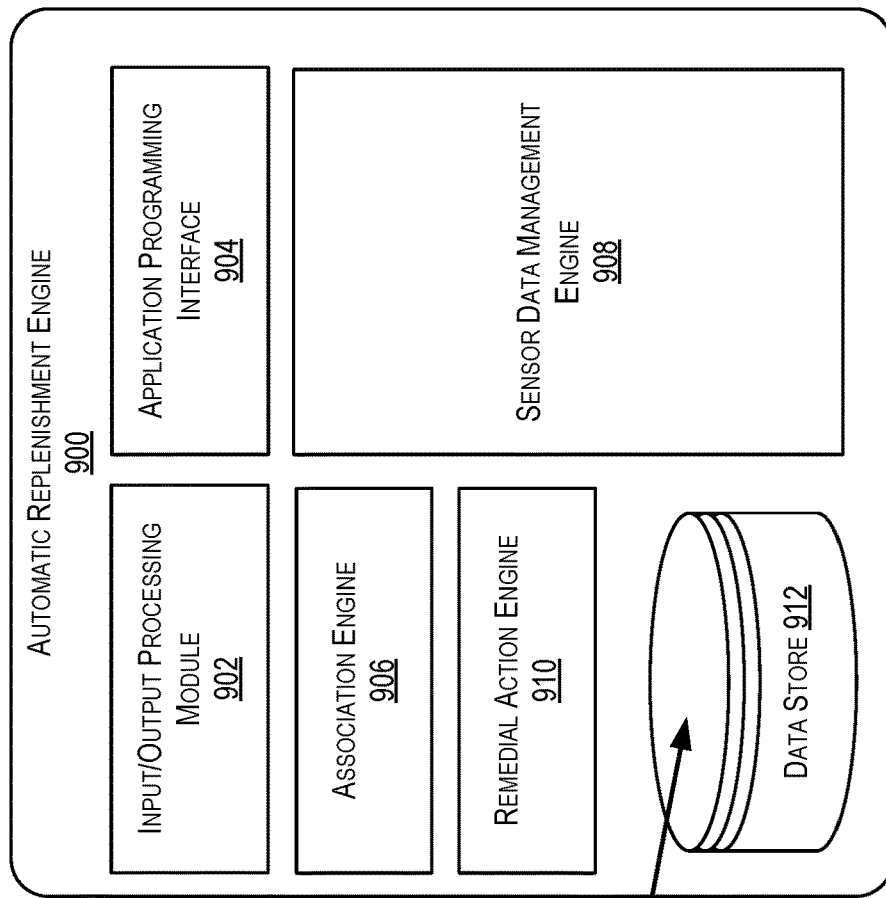
FIG. 9 illustrates a block diagram of components of an automatic replenishment engine, in accordance with at least one embodiment.

FIG. 9 illustrates a block diagram of components of an automatic replenishment engine 900, in accordance with at least one embodiment. Automatic replenishment engine 900 may be an example of the automatic replenishment engine 434 of FIG. 4. As shown, the example embodiment includes a number of modules including, but not limited to, an input/output processing module 902, an application programming interface 904, an association engine 906, a sensor data management engine 908, and a remedial action engine 910. It should be appreciated that each module of FIG. 9 may be executed on a single computer, and or each component, or sets of components may be executed on separate computers. The modules/engines of FIG. 9 may be communicatively coupled to the data store 912 (e.g., the data store 432 of FIG. 4) such that data may be exchanged between the modules/engines and the data store 912.

In at least one embodiment, the automatic replenishment engine 900 includes the application programming interface 904. Generally, the application programming interface 904 may be utilized to receive and/or provide any suitable information to and/or from the automatic replenishment engine 900 (or modules of the automatic replenishment engine 900) with respect to any of the examples provided herein.

In the embodiment shown in the drawings, the input/output processing module 902, a component of the automatic replenishment engine 900, may be configured to provide one or more user interfaces associated with the automatic replenishment engine 900. Such interfaces may be provided via the service provider computer(s) 102 and/or service provider computer(s) 401 of FIGS. 1 and 4, respectively. In some embodiments, the input/output processing module 902 may be configured to receive mapping 914 associated with a user item profile or an aggregated item profile. Mapping 914 may include associations at least between item identifiers, material-specific offsets, and material-specific signal return rates, although additional information may be stored with mapping 914. The mapping 914 may be stored within data store 912 or another suitable storage location accessible to the input/output processing module 902. It should be appreciated that mapping 914 may be stored with any suitable number of mappings available within the data store 912. These mappings may be specific to a specific automatic replenishment device, dimensions/storage capacity of an automatic replenishment device, and/or a sensor (or type of sensor) utilized to obtain sensor data. For example, mapping 914 may be associated with a particular ARD and/or a storage capacity (e.g., 2.5 quarts, 4.5 quarts, 30 lbs., etc.) and/or a particular type of sensor (e.g., a time-of-flight sensor).

In some cases, the input/output processing module 902 may be configured to provide interface(s) for collecting user account information and/or association information related to an item (e.g., the item(s) 110 of FIG. 1) and an ARD (e.g., the ARD 104, 200, 300, and/or 400 of FIGS. 1-4). The input/output processing module 902 may be configured to stored received user account information and/or association information within a user profile associated with a user. In some embodiments, the user profile may be stored within the data store 912 or at another suitable storage location accessible to the input/output processing module 902.

In some embodiments, the input/output processing module 902 may be configured to provide a calculated fill level of an item contained in an ARD. The calculated fill level may be presented via one or more interfaces provided by the input/output processing module 902 and/or the service provider computer(s) 102 and 401, and/or via a notification (e.g., email, text message, push notification etc.) provided by the input/output processing module 902.

It should be appreciated that the input/output processing module 902 may be configured to receive and provide sensor data to any suitable component of the automatic replenishment engine 900.

In some embodiments, the association engine 906 may be configured to receive account information and/or association information (e.g., from the input/output processing module 902). Once received, the association engine 906 may generate and/or store the received account information and/or association information in a user profile maintained by the service provider computer(s) 102 and/or 401. In some examples, the user profile, including the account information and/or the association information may be stored at the data store 912 or another suitable storage location accessible to the association engine 906.

In some embodiments, the sensor data management engine 908 may be configured to receive sensor data (e.g., via the input/output processing module 902). The received sensor data may have been generated by one or more sensors of the ARDs 104, 200, 300, and/or 400 of FIGS. 1-4. The received sensor data may include at least a distance measurement (e.g., quantifying a distance between the sensor and an item within the ARD) and a signal return rate. As described above, the received distance measurement may include some amount of error due to a transmissivity of the item.

In at least one embodiment, the sensor data management engine 908 may receive the sensor data. An item may be identified (e.g., from the user profile), the item being associated with the ARD for which the sensor data was generated. Once the item is identified, the sensor data management engine 908 may identify and consult the mapping 914. It should be appreciated that mapping 914 may be identified from any suitable number of mappings available within the data store 912. As discussed above, these mappings may be specific to a particular automatic replenishment device, dimensions/storage capacity of an automatic replenishment device, and/or a sensor (or type of sensor) utilized to obtain sensor data. In some examples, mapping 914 may include various material-specific offsets for a particular item (e.g., gummi bear brand x) that correspond to particular ARDs and/or types of ARDs and/or types of sensors. That is, the mapping 914 may indicate that the item is associated with a particular material-specific offset for an ARD having a storage capacity of 2.5 quarts and a different material-specific offset for an ARD having a storage capacity of 4.5 quarts. Similarly, the mapping 914 may include various signal return rates corresponding to particular ARDs, particular storage capacities associated with ARDs (e.g., 2.5 quart, 4.5 quart, etc.) and/or particular types of sensors.

Once identified, the mapping 914 may be utilized to obtain a material-specific offset associated with the item, and a material-specific signal return rate (SRR) associated with the item. As discussed above, a material-specific offset may refer to an amount of known sensor data error (e.g., 20%) associated with the item. A "material-specific SRR" may be a predetermined value that indicates an expected SRR when the specific item fills a particular amount (e.g., 20%) of a similar ARD. The values contained within the mapping 914 may be learned from any suitable method such as, but not limited to, controlled testing, customer test measurement, machine learning, or the like. The mapping may indicate, for example, that a particular item (e.g., gummi bears) is associated with a material-specific offset of −44 millimeters and a material-specific SRR of 0.12 (quantifying an expected SRR when the ARD is filled with the item(s) to a particular fill level (e.g., 20%)). The sensor data management engine 908 may access a previously stored empty container SRR value quantifying an expected SRR when the ARD (or a container similar to the ARD) is empty.

In at least one embodiment, the sensor data management engine 908 may be configured to calculate an offset scale. The offset scale may be a calculated value between 0 and 1 that, when applied to a material-specific offset, reduces the material-specific offset at low fill levels to. The offset scale may be calculated to be a value of 1 when the measured fill level corresponding to the distance measurement received via the sensor data indicates a fill level greater than a threshold fill level (e.g., 10%, 20%, etc.) of the ARD. When the measured fill level corresponding to the distance measurement received via the sensor data indicates a fill level less than or equal to the threshold fill level (e.g., 10%, 20%, etc.) of the ARD, the offset scale may be calculated using a ratio of Signal Return Rates (SRR). In some embodiments, the goal is to gradually reduce the material-specific offset as the container empties until no offset is applied when the container is empty. The offset scale may be calculated to be a value of 0 when the measured SRR is greater than or equal to the empty container SRR and 1 when the measured SRR is less than or equal to the predefined material-specific SRR. The offset scale may range from 0 to 1 when SRR of the received sensor data is between the empty container SRR and material-specific SRR. By way of example, the offset scale may be determined according to the following formula:

$$\text{Offset Scale} = \frac{\text{Measured } SRR - \text{Empty Container } SRR}{\text{Material Specific } SRR - \text{Empty Container } SRR}$$

In at least one embodiment, the sensor data management engine 908 may be configured to calculate an adjusted distance based at least in part on the distance measurement received from the sensor data (measured distance), the material specific offset, and the offset scale. The adjusted distance may be calculated based on the following formulas:

Adjusted Distance=Measured Distance+Scaled Material Specific Offset

Scaled Material Offset=Material Specific Offset× Offset Scale

The sensor data management engine 908 may be configured to add the scaled material-specific offset to the distance measurement provided in the sensor data to compensate for inaccuracies in the distance measurement due to the transmissivity of the item(s) being sensed. As mentioned above, the full amount of the material-specific offset may not be needed if the fill level of gummi bears within the ARD is relatively low (e.g., the bottom of the ARD may be visible). By utilizing the offset scale described above, the full material-specific offset may be added to the distance measurement when the item fills more than a threshold amount of space (e.g., 20% of the container) but scaled with the item fills less than the threshold amount of space. The sensor data management engine 908 may utilize the aforementioned formulas to calculate an adjusted distance that may more accurately indicate the actual fill level of an item in the ARD. The actual fill level may be calculated based at least in part on the adjusted distance by any suitable component of the automatic replenishment engine 900.

In some embodiments, the remedial action engine 910 may be configured to perform, or cause performance of, one or more remedial actions based at least in part on the calculated fill level determine using the adjusted distance described above. A remedial action may include, but is not limited to, presenting a current fill level of the item within the ARD, generating an order to replenish the item (e.g., to purchase an item from a provider and/or deliver the item to the user), providing a notification related to the fill level (e.g., via an email, a text message, a website, a push notification, etc.), or the like. As a non-limiting example, given a calculated fill level indicating the item fills less than 10% of the ARD, the remedial action engine 910 may cause the calculated fill level to be provided via a notification to a user device (e.g., the user device 106 of FIG. 1). Additionally, or alternatively, the remedial action engine 910 may cause the calculated fill level to be presented via an application and/or website accessible to the user device 106. In some embodiments, the remedial action engine 910 may cause a notification such as an email, a text message, and/or a push notification to be provided to the user device. The notification may include information indicating that the item is at the current fill level. The notification, in some cases, may include an option for the user to reorder the item. In at least one embodiment, the remedial action engine 910 may be configured to cause an order for the item to be generated on behalf of the user.

FIG. 10 includes graphs 1000A and 1000B which illustrate some improvements to sensor data accuracy, according to some embodiments. Graph 1000A is intended to depict fill level inaccuracies due to uncorrected sensor data. As can be seen via graph 1000A, the fill levels calculated from the inaccurate sensor data appear to fairly consistently off within range 1002, while the fill levels calculated from the inaccurate sensor data appears to vary more wildly within range 1004. Utilizing the techniques described herein, the fill levels may be calculated on the modified sensor data to produce the more accurate fill levels indicated within graph 1000B.

Figure 11:
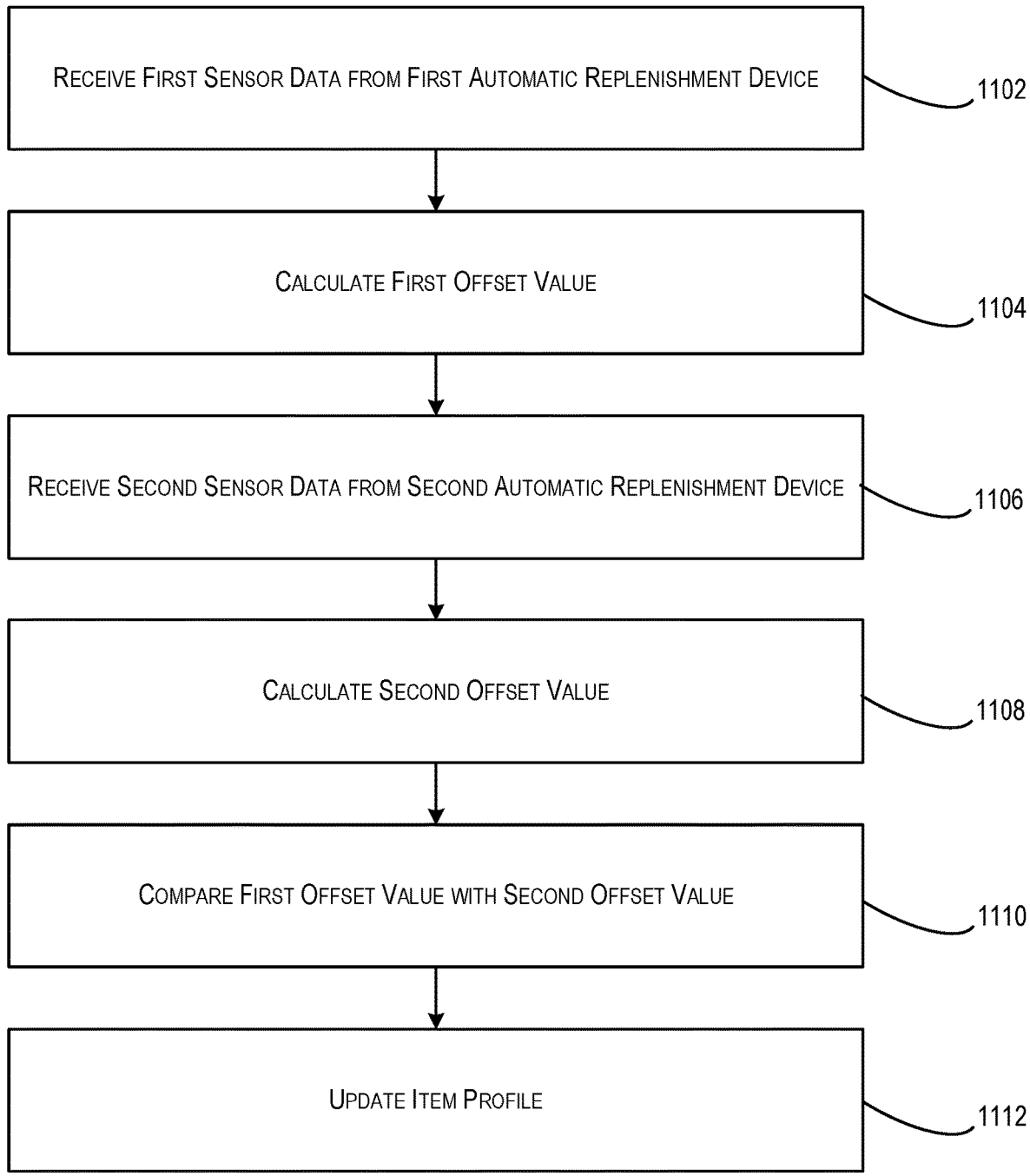
FIG. 11 illustrates a flow diagram of another process for providing test-enabled sensor data, in accordance with at least one embodiment.

FIG. 11 illustrates a flow diagram of a process for providing test-enabled sensor data, in accordance with at least one embodiment. The method 1100 may be performed by one or more components of the automatic replenishment engine 900 in FIG. 9. The method 1100 may performed in any suitable order. It should be appreciated that the method 1100 may include a greater number or a lesser number of steps than that depicted in FIG. 11.

The method may begin at 1102, where a sensor data associated with an item that fills some portion of a first automatic replenishment device (ARD) may be received by a computing device (e.g., sensor data management engine 908 of FIG. 9). In some embodiments, the first ARD comprises one or more sensors configured to collect the sensor data. The sensor data may comprise a measured distance value that quantifies a distance between the sensor and the item. The sensor data may additionally comprise a measured signal return rate that quantifies an amount of light returned to the sensor when collecting the measured distance value.

In some examples, the sensor data may be collected in response to an indication of a first item from a user device. The sensor data management engine 908 may provide a notification that comprises an expected fill value of the first item that fills at least some portion of the first ARD. The sensor data may be received from the first ARD via a transmission that is initiated upon activating the ARD (e.g., by locking the lid, etc.).

At 1104, a first offset value may be calculated. The first offset value may be calculated based at least in part on the measured signal return rate (SRR) of the sensor data and the expected fill value associate with the first ARD. In some examples, the offset value may be calculated by the computing device (e.g., the sensor data management engine 908). The offset value may be based at least in part on the measured signal return rate of the sensor data, the material specific signal return rate associated with the item, and the expected empty signal return rate associated with the automatic replenishment device when empty.

At 1106, second sensor data from a second ARD may be received. For example, the sensor data may be associated with a second item that fills some portion of the automatic replenishment device (ARD). The second sensor data may be transmitted to the same computing device (e.g., sensor data management engine 908 of FIG. 9). In some embodiments, the second ARD comprises one or more sensors configured to collect the sensor data. The sensor data may comprise a measured distance value that quantifies a distance between the sensor and the second item. The sensor data may additionally comprise a measured signal return rate that quantifies an amount of light returned to the sensor when collecting the measured distance value.

At 1108, a second offset value may be determined in association with the second sensor data and the second ARD. For example, the second offset value may be calculated based at least in part on the SRR of the sensor data and the expected fill value associate with the second ARD. In some examples, the second offset value may be calculated by the computing device (e.g., the sensor data management engine 908). The second offset value may be based at least in part on the measured signal return rate of the sensor data, the material specific signal return rate associated with the item, and the expected empty signal return rate associated with the automatic replenishment device when empty.

At 1110, the first offset value and the second offset value may be compared. For example, when the first offset value is within a threshold offset value, the first offset value may be confirmed to correspond with the first item and, as identified at 1112, a user item profile may be updated for the first item. When the first offset value is outside of the threshold offset value, the first offset value may be limited to corresponding with the first item for only a particular ARD and not for all items of the same type.

In some examples, the first offset value and/or the second offset value may be stored with an aggregated item profile. For example, when an aggregated threshold value is exceeded (e.g., at least three sources of sensor data from three different ARDs, etc.), the offset value may be stored with the aggregated item profile. The state for the item may be associated with a verified corrected state or a verified bad state.

Figure 12:
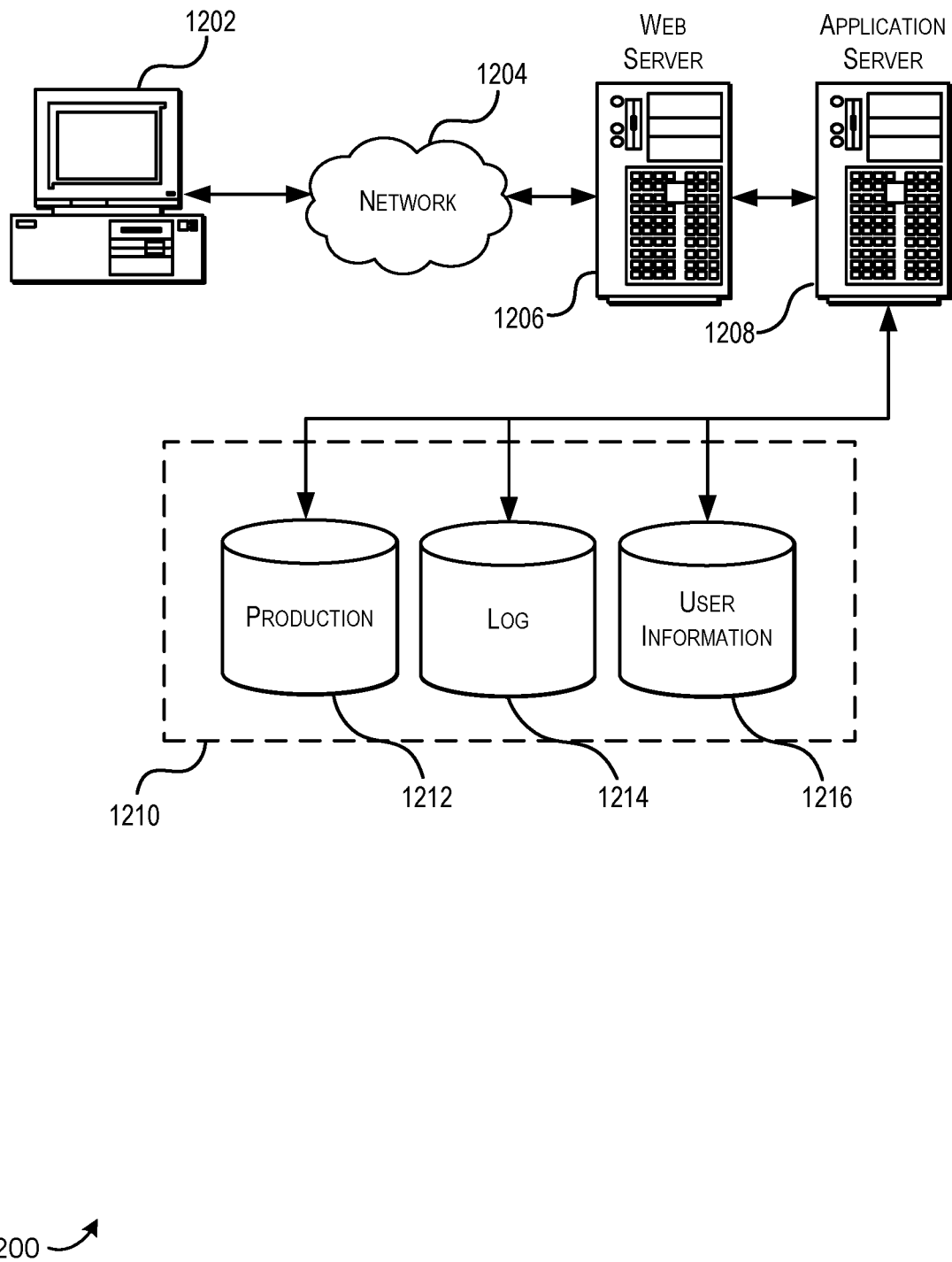
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a first automatic replenishment device (ARD) comprising a first sensor configured to generate first sensor data;
a second ARD comprising a second sensor configured to generate second sensor data;
a memory configured to store computer-executable instructions; and
a processor in communication with the memory configured to execute the computer-executable instructions to at least:
provide, to a user device associated with the first ARD, an instruction that comprises an expected fill value of a first item that fills some portion of the first ARD;
receive, based at least in part on the instruction, the first sensor data from the first ARD, the first sensor data comprising at least one of a measured distance value or a measured time of flight value indicative of a distance between the first sensor and the first item, the first sensor data further comprising a measured signal return rate that quantifies an amount of light returned to the first sensor;
calculate a first offset value based at least in part on the measured signal return rate of the first sensor data and the expected fill value associated with the first ARD;
determine a second offset value based at least in part on the second sensor data from the second ARD, the second ARD storing a second item, the second item being a same type as the first item;
compare the first offset value with the second offset value; and
when a difference between the first offset value and the second offset value is less than a threshold offset value, execute one or more operations to update an aggregated item profile associated with the first item to include the first offset value to be used to monitor the first sensor data from the first ARD, wherein additional sensor data generated by the first sensor or the second sensor and used to measure a fill value is corrected based at least in part on the first offset value.

2. The system of claim 1, wherein the computer-executable instructions are further configured to:
update the aggregated item profile to identify that the first item corresponds with a verified good state, wherein the verified good state indicates multiple sensor data corresponding to offset values are within a second threshold offset value, and differences between the offset values are within a predefined range.

3. The system of claim 1, wherein the computer-executable instructions are further configured to:
update the aggregated item profile to identify that the first item corresponds with a verified corrected state, wherein the verified corrected state indicates multiple sensor data corresponding to offset values are within a second threshold offset value, and differences between the offset values are outside a first predefined range and within a second predefined range.

4. The system of claim 1, wherein the computer-executable instructions are further configured to:
update the aggregated item profile to identify that the first item corresponds with a verified bad state, wherein the verified bad state indicates multiple sensor data corresponding to offset values are outside of a predefined range.

5. The system of claim 1, wherein the computer-executable instructions are further configured to:
update the aggregated item profile to identify that the first item corresponds with an unverified state, wherein the unverified state indicates that multiple sensor data corresponding to offset values have not been received.

6. A computer-implemented method, comprising:
providing, by a computing device, an instruction that comprises an expected fill value of a first item that fills some portion of a first automatic replenishment device (ARD), the first ARD comprising a sensor configured to collect sensor data;
receiving, by the computing device based at least in part on the instruction, the sensor data from the first ARD indicating an amount of the first item stored in a storage associated with the first ARD, the sensor data generated by the sensor of the first ARD;
calculating, by the computing device, a first offset value related to estimating the amount of the first item stored by the first ARD based at least in part on the sensor data;
determining, by the computing device, a second offset value for a second item based at least in part on sensor data from a sensor of a second ARD, the second item being a same type as the first item;
comparing the first offset value with the second offset value; and
when a difference between the first offset value and the second offset value is less than a threshold offset value, updating, by the computing device, a user item profile or an aggregated item profile associated with the first item to include the first offset value to be used to correct the sensor data from the first ARD and estimate the amount of the first item stored by the first ARD.

7. The computer-implemented method of claim 6, further comprising:
updating the user item profile or the aggregated item profile to identify that the first item corresponds with a verified good state or a verified corrected state, wherein the verified good state or the verified corrected state indicates multiple sensor data corresponding to offset values are within a predefined range.

8. The computer-implemented method of claim 7, wherein the predefined range is within zero to five percent.

9. The computer-implemented method of claim 6, further comprising:
calculating an offset value related to the first item or the second item, the offset value being calculated based at least in part on a measured signal return rate, an expected signal return rate associated with the ARD when empty, and a predetermined material-specific signal return rate, wherein the offset value is calculated to be between a lower limit and an upper limit, and wherein the offset value being below the upper limit causes a reduction of a measurement offset value used to calculate an estimated fill level.

10. The computer-implemented method of claim 9, wherein calculating the estimated fill level comprises using the offset value and the measurement offset value to compensate for an amount of sensor inaccuracy of the sensor due to an amount of transmissivity of the first item or the second item.

11. The computer-implemented method of claim 9, wherein the predetermined material-specific signal return rate is initially calculated based at least in part on historical sensor data associated with the first item or the second item.

12. A computer-readable storage medium comprising computer-readable instructions that, upon execution by a computer system, configure the computer system to perform operations comprising:
providing an instruction that comprises an expected fill value of a first item that fills some portion of a first automatic replenishment device (ARD), the first ARD comprising a sensor configured to collect sensor data;
receiving, based at least in part on the instruction, the sensor data from the first ARD indicating an amount of the first item stored in a storage associated with the first ARD, the sensor data generated by the sensor of the first ARD;
calculating a first offset value related to estimating the amount of the first item stored by the first ARD based at least in part on the sensor data;
determining a second offset value for a second item based at least in part on sensor data from a sensor of a second ARD, the second item being a same type as the first item;
comparing the first offset value with the second offset value; and
when a difference between the first offset value and the second offset value is less than a threshold offset value, updating a user item profile or an aggregated item profile associated with the first item to include the first offset value to be used to correct the sensor data from the first ARD and estimate the amount of the first item stored by the first ARD.

13. The computer-readable storage medium of claim 12, the operations further comprising:
prior to providing the instruction, receiving an indication of the first item stored in the storage associated with the first ARD.

14. The computer-readable storage medium of claim 12, the operations further comprising:
initiating an association process for the first item with an account of a user, the account also corresponding with the first ARD.

15. The computer-readable storage medium of claim 12, wherein the expected fill value is adjustable using a tool.

16. The computer-readable storage medium of claim 12, wherein the first offset value or the second offset value adjusts a portion of a measurement offset value to be added to a distance measured to compensate for sensor inaccuracies.

17. The computer-readable storage medium of claim 12, wherein the sensor is a time-of-flight sensor.

18. The computer-readable storage medium of claim 12, wherein the first offset value is associated with an expected signal return rate, and the expected signal return rate is associated with the first ARD when empty is a fixed value that is independent of the first item or the second item contained in the first ARD.

19. The computer-readable storage medium of claim 18, wherein the expected signal return rate is set at a value that is dependent on dimensions and material associated with the ARD and a material associated with the first item or the second item.

20. The computer-readable storage medium of claim 12, wherein a corrected fill level of the first item or the second item within the ARD is calculated by adding a scaled measurement offset value to a distance measured between the sensor and the first item or the second item.

* * * * *

UNITED STATES PATENT AND TRADEMARK OFFICE
CERTIFICATE OF CORRECTION

| | | |
|---|---|---|
| PATENT NO. | : 11,010,711 B1 | Page 1 of 1 |
| APPLICATION NO. | : 15/934780 | |
| DATED | : May 18, 2021 | |
| INVENTOR(S) | : Allison Kramer et al. | |

It is certified that error appears in the above-identified patent and that said Letters Patent is hereby corrected as shown below:

On the Title Page

Item (72) inventor, should read:
Allison Kramer, Seattle, WA;
Samuel Stevens Heyworth, Seattle, WA;
Roland Jones, San Jose, CA;
Devon Merritt, Seattle, WA;
Amirali Virani, Bellevue, WA;
Hannah McClellan Richards, Boise, ID Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*